(12) United States Patent
Bemment et al.

(10) Patent No.: US 12,098,675 B2
(45) Date of Patent: Sep. 24, 2024

(54) COMBUSTION OF FUEL

(71) Applicant: ROLLS-ROYCE PLC, London (GB)

(72) Inventors: Craig W Bemment, Derby (GB);
Benjamin J Keeler, Chesterfield (GB);
Kevin R McNally, Derby (GB);
Andrea Minelli, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 18/337,546

(22) Filed: Jun. 20, 2023

(65) Prior Publication Data

US 2024/0209780 A1    Jun. 27, 2024

(30) Foreign Application Priority Data

Dec. 21, 2022    (GB) ...................... 2219414

(51) Int. Cl.
*F02C 7/14* (2006.01)
*F02C 7/36* (2006.01)
*F23K 5/20* (2006.01)

(52) U.S. Cl.
CPC .................. *F02C 7/14* (2013.01); *F02C 7/36* (2013.01); *F23K 5/20* (2013.01); *F05D 2260/20* (2013.01); *F23K 2300/204* (2020.05)

(58) Field of Classification Search
CPC .... F02C 7/14; F02C 7/36; F02C 7/224; F05D 2260/20; B64D 37/34; F23K 5/20; F23K 2300/204
See application file for complete search history.

(56) References Cited

U.S. PATENT DOCUMENTS

| 8,748,678 B2 | 6/2014 | Knight et al. |
| 10,215,097 B2 | 2/2019 | Miller et al. |
| 10,900,422 B2 | 1/2021 | Logan et al. |
| 11,008,945 B2 | 5/2021 | Kusnierek et al. |
| 11,492,969 B2 | 11/2022 | Bosak et al. |

(Continued)

FOREIGN PATENT DOCUMENTS

EP    3587771 A1    1/2020

OTHER PUBLICATIONS

Andreas Linke-Diesinger, "Systems of Commercial Turbofan Engines," © 2008 Springer-Verlag Berlin Heidelberg, p. 77-82 (Year: 2008).*

(Continued)

*Primary Examiner* — David P. Olynick
(74) *Attorney, Agent, or Firm* — Oliff PLC

(57) ABSTRACT

A method of operating a gas turbine engine, the engine including an engine core with a turbine, a compressor, a combustor arranged to combust a fuel, and a core shaft connecting the turbine to the compressor; a fan upstream of the engine core; a fan shaft; a main gearbox that receives an input from the core shaft and outputs drive to the fan via the fan shaft; a primary oil loop system to supply oil to lubricate the main gearbox; and a heat exchange system to transfer heat between the oil and the fuel, the oil having an average temperature of at least 180° C. on entry to the heat exchange system at cruise conditions. The method includes transferring heat from the oil to the fuel to lower the fuel viscosity to a value of less than or equal to 0.58 mm²/s on entry to the combustor at cruise conditions.

23 Claims, 12 Drawing Sheets

(56) References Cited

U.S. PATENT DOCUMENTS

| | | | |
|---|---|---|---|
| 2005/0155353 | A1 | 7/2005 | Sabatino et al. |
| 2009/0000185 | A1 | 1/2009 | Aulich et al. |
| 2011/0230686 | A1 | 9/2011 | Rusek et al. |
| 2016/0332743 | A1* | 11/2016 | Teicholz ............... F02C 9/28 |
| 2017/0030266 | A1* | 2/2017 | Cerny ............... F02C 7/224 |
| 2017/0058774 | A1* | 3/2017 | Pickford ............... F02C 7/16 |
| 2017/0159564 | A1* | 6/2017 | Miller ............... F02C 7/06 |
| 2017/0159569 | A1* | 6/2017 | Miller ............... F02C 7/06 |
| 2019/0153954 | A1 | 5/2019 | Miller et al. |
| 2020/0291817 | A1 | 9/2020 | Leque et al. |
| 2022/0252011 | A1 | 8/2022 | Rambo et al. |
| 2023/0332543 | A1 | 10/2023 | Bemment et al. |

OTHER PUBLICATIONS

Philip p. Walsh and Paul Fletcher, "Gas Turbine Performance," Second Edition, © 1998, 2004 by Blackwell Science Ltd a Blackwell Publishing company, p. 597. (Year: 2004).*

Laurie Starck, Ludivine Pidol, Nicolas Jeuland, Thierry Chapus, Paul Bogers and Joanna Bauldreay,Production of Hydroprocessed Esters and Fatty Acids (HEFA)—Optimisation of Process Yield, Oil & Gas Science and Technology—Rev. IFP Energies nouvelles (2016) 71, 10 (Year: 2014).*

George R. Wilson, III, Tim Edwards, Edwin Corporan, and Robert L. Freerks, "Certification of Alternative Aviation Fuels and Blend Components," dx.doi.org/10.1021/ef301888b | Energy Fuels 2013, 27, 962-966 (Year: 2013).*

Beginner's Guide to Sustainable Aviation Fuel, Air Transport Action Group, 2017 (Year: 2017).*

Tim Edwards, "Reference Jet Fuels for Combustion Testing," AIAA 2017-0146, Published Online:Jan. 5, 2017https://doi.org/10.2514/6.2017-0146 (Year: 2017).*

Meng Wang , Raf. Dewil , Kyriakos Maniatis , John Wheeldon , Tianwei Tan , Jan Baeyens , Yunming Fang "Biomass-derived aviation fuels: Challenges and perspective," © 2019 Elsevier Ltd. (Year: 2019).*

Rolls-Royce CLEEN II Sustainable Aviation Fuels—Public Version, "FAA Continuous Lower Energy, Emissions, and Noise (CLEEN II) Technologies Program," Rolls-Royce, OTA No. DTFAWA-15-A-80012, Oct. 2021. (Year: 2021).*

James T. Edwards, "Jet Fuel Properties," AFRL-RQ-WP-TR-2020-0017, Jan. 2020 (Year: 2020).*

Kroyan, "Modeling the impact of sustainable aviation fuel properties on end-use performance and emissions in aircraft jet engines", Elsevier, Jun. 21, 2022.

Fortin, "Viscosity Measurements of Aviation Turbine Fuels", National Institute of Standards and Technology, Sep. 3, 2015.

Beginner's Guide to Sustainable Aviation Fuel, Edition 3, Air Transport Action Group, Nov. 2017.

Sustainable Aviation Fuels Guide, Global Environment Facility—Investing in Our Planet, ICAO, 2017.

Sustainable Aviation Fuels Road-Map, Fueling the future of UK aviation, sustainableaviation.co.uk, first availabe on or about Mar. 5, 2020.

Sustainable Aviation Fuel, Review of Technical Pathways, US Department of Energy (Office of Energy Efficiency & Renewable Energy, Sep. 2020.

Ana L. Oldani, Evaluation of physicochemical variability of sustainable aviation fuels, Frontiers in Energy Research, Nov. 24, 2022.

Felix Link, "Viscosity and Density of Narrow Distillation Cuts from Refined Petroleum-and Synthetic-Derived Distillates in the −60 to +60 Degree C Range", ACS Publications, Energy and Fuels, 2002.

* cited by examiner

COMBUSTION OF FUEL

CROSS-REFERENCE TO RELATED APPLICATIONS

This specification is based upon and claims the benefit of priority from UK Patent Application Number 2219414.6 filed on 21 Dec. 2022, the entire contents of which are incorporated herein by reference.

BACKGROUND

Field of the Disclosure

The present disclosure relates to aircraft propulsion systems, and to methods of operating aircraft involving the management of different fluids.

Description of the Related Art

There is an expectation in the aviation industry of a trend towards the use of fuels different from the traditional kerosene-based jet fuels generally used at present. These fuels may have differing fuel characteristics relative to petroleum-based hydrocarbon fuels.

Thus, there is a need to take account of fuel properties for these new fuels and to adjust the methods of operating gas turbine engines.

SUMMARY

According to a first aspect there is provided a method of operating a gas turbine engine, the gas turbine engine comprising:
  an engine core comprising a turbine, a compressor, a combustor arranged to combust a fuel, and a core shaft connecting the turbine to the compressor;
  a fan located upstream of the engine core;
  a fan shaft;
  a gearbox (which may be referred to as a main gearbox) that receives an input from the core shaft and outputs drive to the fan via the fan shaft;
  a primary oil loop system arranged to supply oil to lubricate the gearbox; and a heat exchange system arranged to transfer heat between the oil and the fuel, the oil having an average temperature of at least 180° C. on entry to the heat exchange system at cruise conditions,
  wherein the method comprises controlling the heat exchange system so as to raise the fuel temperature to at least 135° C. on entry to the combustor at cruise conditions.

The method may further comprise the step of conveying the fuel from a fuel tank to the combustor via the heat exchange system.

The heat exchange system comprises at least one heat exchanger through which the oil passes. The heat exchange system may comprise multiple heat exchangers on the same oil loop system. In implementations in which one or more heat exchangers are in series, the oil temperature on entry to the heat exchange system is defined as the oil temperature on entry to the first heat exchanger in the series configuration. In implementations in which one or more heat exchangers are in parallel, with a split in the oil flow, the oil temperature on entry to the heat exchange system may be defined either where the flow splits, or on entry to any first heat exchanger in series on any parallel branch (or to the only heat exchanger on that branch, if applicable)—it being appreciated that heat losses along pipes are generally minimal such that a temperature measurement at any of the listed locations should be very similar to that taken at any other in most, if not all, implementations. In case of doubt, or in implementations with a more complex oil flow arrangement such that heat exchanger inlet temperatures may vary between branches of the same closed-loop oil system, an average of temperatures on entrance to a first heat exchanger reached on each parallel oil flow path is used. This applies to all aspects described herein.

The fuel temperatures on entry to the combustor at cruise conditions may be defined as an average over at least 5 minutes, and optionally over ten minutes or fifteen minutes, under steady state cruise conditions. These average temperatures do not include transient spikes in temperature, which may be defined as fluctuations in temperature of the fuel during operation, often elevation of the temperature. Each fluctuation may not last more than 5 minutes. A fuel temperature of at least 135° C. on entry to the combustor at cruise conditions therefore requires the fuel temperature to remain at or above 135° C. over a period of time, and a transient spike to a temperature above 135° C. is not sufficient.

The same considerations apply to the definition of oil temperature at cruise conditions—any transient spikes in temperature to 180° C. or above would not be sufficient to class as an average temperature of at least 180° C. at cruise conditions; rather, the average temperature must remain at or above that level.

The inventors have appreciated that the use of fuels different from the traditional kerosene-based jet fuels, such as sustainable aviation fuels for example, may allow for higher fuel temperatures on entry to the combustor. Higher fuel temperatures on entry to the combustor may allow for a method providing improved oil cooling (as the fuel is able to take more heat) and/or improved fuel burn efficiency. It will be appreciated that fuel properties on entry to the combustor can affect engine performance, e.g. due to droplet size and nozzle spray characteristics which influence fuel-air mixing and combustion efficiency, and that raising the fuel temperature as described may improve these properties.

The primary oil loop system may be referred to as, or as part of, a recirculating lubrication system. The primary oil loop system may be arranged to supply oil to lubricate and/or cool the gearbox, the oil transporting heat away from the gearbox and being cooled before it re-enters the gearbox. The primary oil loop system may be additionally arranged to supply oil to lubricate and/or cool one or more other engine components in addition to the main gearbox, for example an auxiliary gearbox (AGB) and/or one or more bearing chambers.

The method may comprise transferring heat from the oil to the fuel before the oil re-enters the gearbox so as to raise the fuel temperature whilst lowering the oil temperature. This may improve fuel heating, so allowing for more efficient combustion, whilst also improving oil cooling, allowing for more efficient engine heat management and operation. In particular, the cooler oil may allow more heat to be carried away from engine components such as bearings for the same oil flow rate, or may allow a lower oil flow rate to be used for the same level of cooling.

It will be appreciated that use of the oil in the gearbox heats the oil—the oil therefore lubricates the gearbox and also cools the gearbox, as it carries heat away from the gearbox.

The method may comprise transferring heat from the oil to the fuel before the oil re-enters the gearbox so as to raise the fuel temperature to an average of at least 140° C., 150° C., 160° C., 170° C., 180° C., 190° C., or 200° C. on entry to the combustor at cruise conditions.

The method may comprise transferring heat from the oil to the fuel before the oil re-enters the gearbox so as to raise the fuel temperature to an average of between 135-150° C., 135-160° C., 135-170° C., 135-180° C., 135-190° C., or 135-200° C. on entry to the combustor at cruise conditions.

The method may comprise transferring heat from the oil to the fuel before the oil re-enters the gearbox so as to raise the fuel temperature to an average of up to 200° C., 210° C., 220° C., 230° C., 240° C., or 250° C. on entry to the combustor at cruise conditions.

In addition to gaining heat from the main gearbox, the oil may pass through and cool one or more other engine components, optionally including an auxiliary gearbox (AGB) and/or one or more bearing chambers. These engine components may add more heat to the oil, raising its temperature to higher than it would be from heat taken from the main gearbox alone.

The oil in the recirculating lubrication system may therefore pass through an auxiliary gearbox and one or more journal bearings of the engine as well as through the main gearbox, and the oil may have an average temperature of up to 220° C. on entry to the heat exchange system at cruise conditions (even if oil leaving the main gearbox is significantly cooler).

The oil may have an average temperature of at least 200° C. on exit from the engine components it is arranged to cool, at cruise conditions. The temperature of the oil on exit from the engine components cooled by the oil may be at least substantially equal to the temperature of the oil on entry to the heat exchange system. Unlike for returned fuel, for which a larger amount of cooler fuel may be present in the fuel tank and cool returned fuel, the amount of "spare" oil in the recirculating lubrication system may be much less and so even a return to tank between the engine components and entry to the heat exchange system may not significantly affect the temperature.

In some implementations, the hottest oil (e.g. from engine components including the AGB) may be sent directly to a fuel-oil heat exchanger instead of being mixed with cooler oil in a main oil tank first, for example so as to increase a temperature rise of the fuel.

The oil may have an average temperature of up to 220° C. on entry to the heat exchange system at cruise conditions. The oil may have an average temperature of less than 220° C. on entry to the heat exchange system at cruise conditions. The heat exchange system may be controlled to keep the oil temperature on entry to the heat exchange system below 220° C. at cruise conditions.

It will be appreciated that the oil from the primary oil loop system may not be the only heat input to the fuel to achieve the desired fuel temperature, but that heat transfer from that oil may assist in raising the fuel temperature. For example, additional heat may be provided from a separate lubrication system or a separate part of the engine's overall lubrication system (e.g. using oil used to lubricate components of or associated with an integrated drive generator in a secondary oil loop system), and/or from heat exchange with exhaust gases.

The oil which lubricates the gearbox is supplied by the primary oil loop system, which may be a closed-loop system. The primary closed-loop system may be described as containing a first oil. The gas turbine engine may further comprise a second (secondary) oil loop system, optionally being a secondary closed-loop lubrication system, with a second oil arranged to lubricate other components. The first and second oils may be chemically distinct, or may be chemically identical and simply physically separated.

The method may comprise transferring heat from the second oil to the fuel (directly or indirectly) to assist in raising the fuel temperature to an average of at least 135° C. on entry to the combustor at cruise conditions.

The step of controlling the heat exchange system so as to raise the fuel temperature may comprise adjusting an amount of fuel (or oil) sent through at least one of the primary fuel-oil heat exchanger and the secondary fuel-oil heat exchanger (as opposed to bypassing the respective heat exchanger).

The heat exchange system may comprise at least one bypass pipe arranged to allow fuel (or oil) to bypass a heat exchanger, or multiple heat exchangers, of the heat exchange system. The method may comprise adjusting the amount of fuel (or oil) sent through the bypass pipe based on fuel temperature.

According to a second aspect, there is provided a gas turbine engine for an aircraft, the gas turbine engine comprising:
- an engine core comprising a turbine, a compressor, a combustor arranged to combust a fuel, and a core shaft connecting the turbine to the compressor;
- a fan located upstream of the engine core;
- a fan shaft;
- a gearbox arranged to receive an input from the core shaft and to output drive to the fan via the fan shaft;
- a primary oil loop system arranged to supply oil to lubricate the gearbox; and
- a heat exchange system arranged to transfer heat between the oil and the fuel, the primary oil loop system being arranged such that the oil has an average temperature of at least 180° C. on entry to the heat exchange system at cruise conditions, and wherein the heat exchange system is arranged to raise the fuel temperature to an average of at least 135° C. on entry to the combustor at cruise conditions.

The gas turbine engine may further comprise an auxiliary gearbox. The oil in the recirculating lubrication system may be arranged to cool the auxiliary gearbox, thereby increasing in temperature.

The gas turbine engine may further comprise one or more bearing chambers. The oil in the recirculating lubrication system may be arranged to cool the one or more bearing chambers, thereby increasing in temperature.

The heat exchange system may comprise multiple heat exchangers. The heat exchange system may comprise one or more pumps, valves, recirculation pipes, and/or bypass pipes to allow flows of oil and/or fuel through and around heat exchangers to be controlled so as to tailor heat transfer, and thereby adjust viscosity.

The apparatus of the second aspect may be used to implement the method of the first aspect, and may have any of the features described with respect to the first aspect.

According to a third aspect, there is provided a method of operating a gas turbine engine, the gas turbine engine comprising:
- an engine core comprising a turbine, a compressor, a combustor arranged to combust a fuel, and a core shaft connecting the turbine to the compressor;
- a fan located upstream of the engine core;
- a fan shaft;

a gearbox that receives an input from the core shaft and outputs drive to the fan via the fan shaft;

a primary oil loop system arranged to supply oil to lubricate the gearbox; and a heat exchange system arranged to transfer heat between the oil and the fuel, wherein the primary oil loop system is arranged such that the oil has an average temperature of at least 180° C. on entry to the heat exchange system at cruise conditions, wherein the method comprises controlling the heat exchange system so as to transfer 200-600 kJ/m³ of heat to the fuel from the oil at cruise conditions.

The transfer of heat to the fuel from the oil can be used to control the oil temperature on entry to the gearbox. It will be appreciated that cooling of the oil exiting the gearbox can be used to allow control of the oil temperature on entry to the gearbox. For example, the primary oil loop system may be or comprise a closed loop which recirculates oil, or may be otherwise designed whilst still having a recirculating character such that the oil, having been cooled by transferring heat to the fuel, is then returned to the gearbox in order to cool the gearbox. The cooling of the gearbox can therefore benefit from the prior heat transfer into the fuel from the oil. As such, heat is picked up by the oil in the gearbox, and at least some of that heat is then transferred to the fuel, which proceeds to be burned in the combustor. That same, cooled, oil is then recirculated back to the gearbox to provide further cooling. The skilled person would appreciate that oil is generally recirculated through an engine many times, whereas most of the fuel passes through only once.

The heat transfer is measured per cubic meter of the fuel reaching the combustor. The amount of heat transferred to the fuel may therefore be calculated based on a temperature of fuel on approach or entry to the combustor as compared to a temperature of fuel upstream of the heat exchange system (for example in a fuel tank of the aircraft). As heat transfer is measured per unit volume of fuel, this may be thought of as a heat transfer rate normalised for fuel flow rate variations at cruise.

The inventors have appreciated that the use of fuels different from the traditional kerosene-based jet fuels, such as sustainable aviation fuels, may allow for more heat to be transferred to the fuel from the oil per unit volume of the fuel through the heat exchange system. Higher fuel temperatures on entry to the combustor may allow for a method providing improved oil cooling and/or improved fuel burn efficiency, as described above with reference to the first aspect. In particular, the transfer of 200-600 kJ per cubic meter of fuel of heat away from the oil may provide cooler oil to engine components, so allowing them to be more efficiently cooled, and/or cooled to a lower temperature than otherwise.

The method may comprise transferring 300-500 kJ/m³ of heat to the fuel from the oil through the heat exchange system at cruise conditions.

The method may comprise transferring 340-450 kJ/m³ of heat to the fuel from the oil through the heat exchange system at cruise conditions.

The method may comprise transferring 350-450 kJ/m³ of heat to the fuel from the oil through the heat exchange system at cruise conditions.

The method may comprise transferring 400 kJ/m³ of heat to the fuel from the oil through the heat exchange system at cruise conditions.

The oil may have an average temperature of at least 200° C. on entry to the heat exchange system at cruise conditions.

The oil may have an average temperature of up to 220° C. on entry to the heat exchange system at cruise conditions.

The oil may have an average temperature of less than 220° C. on entry to the heat exchange system at cruise conditions. The heat exchange system may be controlled to keep the oil temperature on entry to the heat exchange system below 220° C. at cruise conditions.

The step of transferring the heat/controlling the heat exchange system may comprise adjusting an amount of fuel (or oil) sent through at least one of the primary fuel-oil heat exchanger and the secondary fuel-oil heat exchanger (as opposed to bypassing the respective heat exchanger).

The heat exchange system may comprise at least one bypass pipe arranged to allow fuel (or oil) to bypass a heat exchanger, or multiple heat exchangers, of the heat exchange system. The method may comprise adjusting the amount of fuel (or oil) sent through the bypass pipe based on fuel temperature.

According to a fourth aspect there is provided a gas turbine engine for an aircraft, the gas turbine engine comprising:

an engine core comprising a turbine, a compressor, a combustor arranged to combust a fuel, and a core shaft connecting the turbine to the compressor;

a fan located upstream of the engine core;

a fan shaft;

a gearbox arranged to receive an input from the core shaft and to output drive to the fan via the fan shaft;

a primary oil loop system arranged to supply oil to lubricate the gearbox; and a heat exchange system arranged to transfer heat between the oil and the fuel, the primary oil loop system being arranged such that the oil has an average temperature of at least 180° C. on entry to the heat exchange system at cruise conditions, wherein the heat exchange system is arranged to transfer 200-600 kJ/m³ of heat to the fuel from the oil at cruise conditions.

The heat exchange system may therefore be arranged to control the oil temperature on entry to the gearbox, as described in more detail above with respect to the third aspect.

The gas turbine engine may further comprise an auxiliary gearbox. The oil in the recirculating lubrication system may be arranged to cool the auxiliary gearbox, thereby increasing in temperature. Some of the heat transferred to the fuel may therefore originate from an auxiliary gearbox.

The gas turbine engine may further comprise one or more bearing chambers. The oil in the recirculating lubrication system may be arranged to cool the one or more bearing chambers, thereby increasing in temperature. Some of the heat transferred to the fuel may therefore originate from a bearing chamber.

The heat exchange system may comprise multiple heat exchangers. The heat exchange system may comprise one or more pumps, valves, recirculation pipes, and/or bypass pipes to allow flows of oil and/or fuel through and around heat exchangers to be controlled so as to tailor heat transfer, and thereby adjust viscosity.

The apparatus of the fourth aspect may be used to implement the method of the third aspect, and may have any of the features described with respect to the third aspect.

In addition, any or all features of the first or second aspects may be used in conjunction with features of the third and/or fourth aspects.

According to a fifth aspect there is provided a method of operating a gas turbine engine, the gas turbine engine comprising:

an engine core comprising a turbine, a compressor, a combustor arranged to combust a fuel, and a core shaft connecting the turbine to the compressor;
a fan located upstream of the engine core;
a fan shaft;
a gearbox that receives an input from the core shaft and outputs drive to the fan via the fan shaft;
a primary oil loop system arranged to supply oil to lubricate the gearbox; and
a heat exchange system arranged to transfer heat between the oil and the fuel, the oil having an average temperature of at least 180° C. on entry to the heat exchange system at cruise conditions,
wherein the method comprises controlling the heat exchange system so as to lower the fuel viscosity to a maximum of 0.58 mm$^2$/s on entry to the combustor at cruise conditions.

The viscosity of fuel entering the combustor at cruise conditions is therefore lowered to a value below or equal to 0.58 mm$^2$/s.

The method may further comprise the step of conveying the fuel from a fuel tank to the combustor via the heat exchange system.

The inventors have appreciated that fuel viscosity has an effect on how the fuel is delivered into and ignited in the combustor (for example, droplet size from fuel spray nozzles, which may impact burn efficiency). Taking the fuel viscosity into account when delivering fuel to the combustor, and controlling it as appropriate by varying heat input, may therefore provide more efficient fuel-burn, improving aircraft performance.

It will be appreciated that lowering viscosity too far may worsen burn efficiency and/or deleteriously affect the lubrication of engine components (e.g. pump bearings) by the fuel. Further, a low fuel viscosity may increase laminar leakages within certain components. A minimum viscosity may therefore also be selected. For example, the method may comprise controlling the heat exchange system such that the fuel viscosity remains above 0.2 mm$^2$/s, 0.25 mm$^2$/s, 0.3 mm$^2$/s, 0.35 mm$^2$/s, or 0.4 mm$^2$/s on entry to the combustor at cruise conditions.

The method may comprise transferring heat to the fuel from the oil before the fuel enters the combustor so as to lower the fuel viscosity to between 0.58 mm$^2$/s and 0.30 mm$^2$/s on entry to the combustor at cruise conditions.

The method may comprise transferring heat to the fuel from the oil before the fuel enters the combustor so to lower the fuel viscosity to between 0.50 mm$^2$/s and 0.35 mm$^2$/s, or between 0.48 mm$^2$/s and 0.40 mm$^2$/s, or between 0.44 mm$^2$/s and 0.42 mm$^2$/s on entry to the combustor at cruise conditions.

The method may comprise transferring heat to the fuel from the oil before the fuel enters to the combustor so as to lower the fuel viscosity to a maximum of 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s or lower on entry to the combustor at cruise conditions.

The oil may have an average temperature of at least 200° C. on entry to the heat exchange system at cruise conditions.

The oil may have an average temperature of up to 220° C. on entry to the heat exchange system at cruise conditions. The oil may have an average temperature of less than 220° C. on entry to the heat exchange system at cruise conditions. The heat exchange system may be controlled to keep the oil temperature on entry to the heat exchange system below 220° C. at cruise conditions.

The step of controlling the heat exchange system so as to lower the fuel viscosity may comprise adjusting an amount of fuel (or oil) sent through at least one of the primary fuel-oil heat exchanger and the secondary fuel-oil heat exchanger (as opposed to bypassing the respective heat exchanger).

The heat exchange system may comprise at least one bypass pipe arranged to allow fuel (or oil) to bypass a heat exchanger, or multiple heat exchangers, of the heat exchange system. The method may comprise adjusting the amount of fuel (or oil) sent through the bypass pipe based on fuel temperature.

According to a sixth aspect there is provided a gas turbine engine for an aircraft, the gas turbine engine comprising:
an engine core comprising a turbine, a compressor, a combustor arranged to combust a fuel, and a core shaft connecting the turbine to the compressor;
a fan located upstream of the engine core;
a fan shaft;
a gearbox arranged to receive an input from the core shaft and to output drive to the fan via the fan shaft;
a primary oil loop system arranged to supply oil to lubricate the gearbox; and
a heat exchange system arranged to transfer heat between the oil and the fuel, the primary oil loop system being arranged such that the oil has an average temperature of at least 180° C. on entry to the heat exchange system at cruise conditions,
wherein the heat exchange system is arranged to transfer heat from the oil to the fuel so as to lower the fuel viscosity to a maximum of 0.58 mm$^2$/s on entry to the combustor at cruise conditions.

The gas turbine engine may further comprise an auxiliary gearbox. The oil in the recirculating lubrication system may be arranged to cool the auxiliary gearbox, thereby increasing in temperature.

The gas turbine engine may further comprise one or more bearing chambers. The oil in the recirculating lubrication system may be arranged to cool the one or more bearing chambers, thereby increasing in temperature.

The heat exchange system may comprise multiple heat exchangers. The heat exchange system may comprise one or more pumps, valves, recirculation pipes, and/or bypass pipes to allow flows of oil and/or fuel through and around heat exchangers to be controlled so as to tailor heat transfer, and thereby adjust viscosity.

The oil may have an average temperature of 180-230° C. on entry to the heat exchange system at cruise conditions. The oil may have an average temperature of 185-225° C. on entry to the heat exchange system at cruise conditions. The oil may have an average temperature of 190-220° C. on entry to the heat exchange system at cruise conditions.

The oil may have an average temperature of at least 50° C. on entry to the gearbox at cruise conditions. The oil may have an average temperature of at least 75° C. on entry to the gearbox at cruise conditions. The oil may have an average temperature of at least 80° C., 85° C., 90° C., 95° C., 100° C., 105° C., 110° C., 115° C. or 120° C. on entry to the gearbox at cruise conditions.

The oil may have an average temperature in the range 50° C.-100° C. on entry to the gearbox at cruise conditions. The oil may have an average temperature in the range 50° C.-105° C., 50° C.-110° C., 50° C.-115° C. or 50° C.-120° C. on entry to the gearbox at cruise conditions.

The apparatus of the sixth aspect may be used to implement the method of the fifth aspect, and may have any of the features described with respect to the fifth aspect.

In addition, any or all features of the first, second, third, or fourth aspects may be used in conjunction with features of the fifth and/or sixth aspects The below features may be applied to any of the above aspects.

The heat exchange system may comprise a primary fuel-oil heat exchanger and a secondary fuel-oil heat exchanger. The fuel may flow through the secondary fuel-oil heat exchanger prior to flowing through the primary fuel-oil heat exchanger.

The primary fuel-oil heat exchanger may be referred to as a main fuel-oil heat exchanger. The majority of the heat transfer between the oil and the fuel may occur in the primary fuel-oil heat exchanger. The primary function of the primary fuel-oil heat exchanger may be to heat the fuel before it is provided to the combustor. At least substantially all of the fuel may pass through the main fuel-oil heat exchanger.

At least substantially all of the fuel may also pass through the secondary fuel-oil heat exchanger.

A ratio of the heat transfer from the oil to the fuel for the primary and secondary fuel-oil heat exchangers may be approximately between 70:30 and 90:10. The primary fuel-oil heat exchanger may therefore be responsible for 70-90% of the heat transfer—it may be referred to as "primary" due to being responsible for most of the heat transfer, i.e. being the primary source of heat for heating the fuel before entry to the combustor, despite being the second fuel-oil heat exchanger the fuel reaches in some examples.

A ratio of the heat transfer from the oil to the fuel for the primary and secondary fuel-oil heat exchangers may be approximately 80:20.

In other examples, the ratio of the heat transfer from the oil to fuel for the secondary fuel-oil heat exchanger may be higher.

The gas turbine engine may further comprise:
an integrated drive generator; and
a secondary oil loop system arranged to provide oil to the integrated drive generator.

The heat exchange system may be arranged to transfer heat from the oil in the secondary closed loop system to the fuel.

The heat exchange system may comprise an oil-oil heat exchanger arranged to transfer heat between the oil of the primary loop system and the oil of the secondary loop system.

The primary oil loop system may comprise two branches through which oil flows, to provide a parallel heat exchanger configuration, and an air-oil heat exchanger. The oil-oil heat exchanger may be on the same branch as the air-oil heat exchanger.

In implementations with an integrated drive generator and a secondary oil loop system, the heat exchange system may comprise:
a primary fuel-oil heat exchanger arranged to receive the fuel and oil from the primary oil loop system; and
a secondary fuel-oil heat exchanger arranged to receive the fuel and oil from the secondary oil loop system The method may comprise transferring heat between the oil from the secondary oil loop system and the fuel using the secondary fuel-oil heat exchanger.

The fuel may flow through the secondary fuel-oil heat exchanger prior to flowing through the primary fuel-oil heat exchanger, such that heat is transferred from the oil in the secondary oil loop system to the fuel before heat is transferred from the oil in the primary oil loop system to the fuel.

The controlling the heat exchange system may comprise adjusting an amount of fuel sent through at least one of the primary fuel-oil heat exchanger and the secondary fuel-oil heat exchanger.

The heat exchange system may comprise at least one bypass pipe arranged to allow fuel to bypass a heat exchanger of the heat exchange system. The method may comprise adjusting the amount of fuel sent through the bypass pipe (instead of through the corresponding heat exchanger). This adjustment may be performed based on one or more of (i) fuel temperature (e.g. on entry to the combustor), (ii) oil temperature (e.g. on entry to or exit from the gearbox, on exit from one or more other engine components to be lubricated and/or cooled, or on entry to the heat exchange system), and (iii) fuel viscosity (e.g. on entry to the combustor).

More heat may be output into oil in the primary closed loop system by the gearbox than is output into oil in the secondary closed loop system by the integrated drive generator (IDG).

It will be appreciated that whilst the gearbox generally outputs more heat in terms of absolute heat rejection, the heat rejection from a power gearbox (PGB) generally results in low-grade heat with relatively high oil flow rates—i.e. the oil flow rate may be kept high such that the oil leaving the gearbox does not reach as high a temperature as it would were the oil flow rate the same as through the IDG. The oil leaving the PGB is generally still hotter than the oil leaving the IDG, although it will be appreciated that this may vary between implementations.

For example, a PGB may output around 75 kW of heat at cruise. The oil volumetric flow to the PGB at the same conditions may be around 0.002 m$^3$/s. By contrast, an IDG may output only around 18.4 kW of heat at cruise, so only about 25% of the heat output of the PGB—the PGB therefore may output around four times as much heat as the IDG. However, the oil volumetric flow rate to the IDG may be only around 0.00062 m$^3$/s. Oil leaving the PGB may therefore have only around 1.2 times the heat transferred to it per unit volume as compared to oil leaving the IDG, despite the PGB's heat output being four times as high.

PGB oil flow rate at cruise may be between 100 litres per minute and 150 litres per minute, and optionally may be around or equal to 126 l/min. IDG oil flow rate at cruise may be between 30 litres per minute and 45 litres per minute, and optionally may be around or equal to 37 l/min.

PGB heat output in various implementations may be from 50 to 100 kW. IDG heat output in various implementations may be from 5 kW to 25 kW.

The heat exchange system may comprise multiple heat exchangers arranged to cool the oil before it re-enters the gearbox.

The multiple heat exchangers may include a fuel-oil heat exchanger and at least one other heat exchanger. The at least one other heat exchanger may be at least one of:
(i) an air-oil heat exchanger; and
(ii) an oil-oil heat exchanger, having a flow of oil from a different source flowing therethrough.

The multiple heat exchangers may be arranged in a parallel configuration. The method may comprise sending a proportion of the oil through each branch of the parallel configuration, and adjusting that proportion to vary how much oil flows through the fuel-oil heat exchanger and how much oil flows through a heat exchanger (and optionally through multiple heat exchangers) on the other branch.

Multiple fuel-oil heat exchangers may be provided.

The gas turbine engine may further comprise an oil-oil heat exchanger. The oil-oil heat exchanger may form a part of the heat exchange system of the engine, and of one or more closed loop oil systems of the engine.

The primary closed loop system and the secondary closed loop system may be configured to interact via at least one oil-oil heat exchanger such that heat may be transferred from one flow of oil to the other.

The gas turbine engine may further comprise an integrated drive generator, and a secondary closed loop oil system, wherein the secondary closed loop system is arranged to provide oil to the integrated drive generator, and wherein the heat exchange system is arranged to transfer heat from the oil in the secondary closed loop system to the fuel.

The gearbox may be a power gearbox. The power gearbox may comprise one or more gears. The power gearbox may comprise one or more journal bearings. The oil (and in particular, the oil in a primary closed loop system of a recirculating oil system as described below) may lubricate and cool the one or more journal bearings of the gearbox.

The gas turbine engine may comprise one or more fuel-oil heat exchangers. The one or more fuel-oil heat exchanges may form all or part of the heat exchange system. The gas turbine engine may comprise two or more fuel-oil heat exchangers. Alternatively or additionally, an intermediate heat transfer fluid (or other substance) may be used for the heat exchange between the oil and fuel—for example, an oil-working fluid heat exchanger and a physically separate but fluidly connected fuel-working fluid heat exchanger may be used in place of a direct fuel-oil heat exchanger. The working fluid may therefore act as a coolant for the oil, and then transfer that heat to the fuel.

The aircraft comprises a fuel supply system arranged to supply the fuel to one or more engines of the aircraft. The fuel supply system may comprise a fuel tank pump which may be a low-pressure pump, arranged to provide fuel from one or more fuel tanks to a gas turbine engine, to power the gas turbine engine. The fuel tank pump may be associated with a fuel tank. The fuel tank pump may be described as being part of a fuel supply system, but not a part of the gas turbine engine itself. The fuel tank pump is located upstream of the gas turbine engine.

The fuel tank pump may be configured to pump fuel from the fuel tank towards the engine, and more specifically towards a first fuel-oil heat exchanger of the engine. The fuel tank pump is located before, or upstream, of the engine, and therefore also upstream of the one or more heat exchangers of the engine.

The gas turbine engine may comprise an engine fuel pump configured to pump a flow of fuel received from the tank towards the combustor.

The engine fuel pump is located downstream of the fuel tank pump. The engine fuel pump may be described as a main fuel pump. The engine fuel pump may be located downstream of one or more heat exchangers of the heat exchange system, and optionally may be downstream of the single heat exchanger, or of all heat exchangers, along the fuel flow path.

One or more fuel pumps may be located at any suitable location(s) along the fuel flow path from the fuel tank to the combustor. In some examples, one or more additional fuel pumps may be present, beyond the fuel tank pump and the engine fuel pump described above. The engine fuel pump may be located at any suitable position in relation to the fuel tank pump and the heat exchanger(s).

At cruise conditions, a flow of oil entering the or each fuel-oil heat exchanger may have a higher average temperature than the fuel entering that fuel-oil heat exchanger. In this way, thermal energy may be transferred from the flow of oil to the flow of fuel flowing through the or each fuel-oil heat exchanger at cruise conditions. As such, fuel leaving the or each fuel-oil heat exchanger may have a higher temperature than fuel entering that fuel-oil heat exchanger, at cruise conditions. A person skilled in the art will understand that heat exchangers may be configured in any suitable way to allow for the transfer of thermal energy between two separated flows of fluids.

The gas turbine engine may be configured such that the flow of fuel flows from the first fuel-oil heat exchanger towards a second fuel-oil heat exchanger. In other examples, a third, fourth or any suitable number of further fuel-oil heat exchangers are present. In this way, in various examples, one or more fuel-oil heat exchangers may be arranged downstream from the fuel tank pump/on the fuel flow path through the engine.

The gas turbine engine may comprise an integrated drive generator. The integrated drive generator may comprise an electrical generator suitable for supplying power to one or more aircraft systems, such as fuel and/or hydraulic pumps.

In some implementations, the engine may comprise two fuel-oil heat exchangers. The first fuel-oil heat exchanger reached by the fuel may use oil which cools and/or lubricates an integrated drive generator (IDG), and may therefore be described as an integrated drive generator (IDG) fuel-oil heat exchanger. The second fuel-oil heat exchanger reached by the fuel may use oil which cools and/or lubricates a main gearbox of the engine, and may therefore be described as a main fuel-oil heat exchanger. Generally, the main fuel-oil heat exchanger may transfer more heat to the oil than the IDG fuel-oil heat exchanger does, and may therefore be referred to as the primary heat exchanger. The IDG fuel-oil heat exchanger may be described as a secondary fuel-oil heat exchanger accordingly.

The fuel may flow through the IDG fuel-oil heat exchanger and then flow through the main fuel-oil heat exchanger. The oil which flows through the IDG fuel-oil heat exchanger may be used to cool and/or lubricate the IDG. The oil which flows through the main fuel-oil heat exchanger may be used to cool and/or lubricate the power gearbox.

One or more fuel valves may be present along the fuel flow path, wherein each valve may be operable to control a flow rate of fuel therethrough.

All of the flow of fuel may pass through the secondary (IDG) fuel-oil heat exchanger. All of the fuel may pass through the primary (main) fuel-oil heat exchanger.

In other examples, at least a portion of the fuel may not pass through the secondary fuel-oil heat exchanger. At least a portion of the fuel may not pass through the primary fuel-oil heat exchanger. A bypass route may be provided for one or each heat exchanger, to allow a portion of the fuel to bypass that heat exchanger.

The primary closed loop oil system (also referred to as the primary oil loop system) may form part of a recirculating lubrication system of the engine. The primary closed loop system may be configured to supply a recirculating flow of oil to the main gearbox of the engine. One or more of the fuel-oil heat exchangers may be arranged to have oil which passes through the main gearbox therein, and may therefore be described as forming part of the primary closed loop system. The primary fuel-oil heat exchanger may form part of the primary closed loop system.

The recirculating lubrication system may be described as an oil heat management system.

The primary closed loop system may comprise at least a first oil pump configured to pump a flow of oil around at least a portion of the recirculating lubrication system. The first oil pump may be located at any suitable position around the primary closed loop system of the recirculating lubrication system. The primary closed loop system may be configured such that the flow of oil flows through the main gearbox so as to lubricate and/or cool one or more components (e.g. gears of the gearbox and/or journal bearings) and is then collected in a sump. The first oil pump may be configured to pump oil from the sump to a first oil tank. As such, the first oil pump may be described as a scavenge pump.

The first oil tank may be suitable for containing a volume of oil. The first oil tank may be configured to contain any suitable volume of oil. The first oil tank may be arranged to remove gases from the oil in the first oil tank. Oil leaving the first oil tank may pass through a filter, strainer, or the like.

A second oil pump may be located between the first oil tank and the first fuel-oil heat exchanger. The second oil pump may be described as a feed pump. The second oil pump may be configured to pump oil from the first oil tank to the first fuel-oil heat exchanger.

In some implementations, the flow of oil in the primary closed loop system may be diverted to flow along parallel flow paths such that at least a portion of the oil flows through the primary fuel-oil heat exchanger and at least a portion of the oil flows through another, separate, heat exchanger such as an oil-oil heat exchanger or an air-oil heat exchanger, for example.

The method may comprise transferring at least 40% of the heat lost from the oil to the fuel, with the remainder of the heat transferred from the oil to air, or to oil of the secondary oil loop described below. The method may comprise transferring at least 50%, 60%, or 70% of the heat lost from the oil to the fuel, with the remainder of the heat transferred from the oil to air or to a different oil flow.

The primary fuel-oil heat exchanger uses oil from the primary closed loop system to heat the fuel/uses fuel to cool the oil from the primary closed loop system.

The recirculating lubrication system may comprise a secondary closed loop system. The primary and secondary closed loop systems may be fluidly isolated such that oil never mixes between the two.

The secondary closed loop system may be configured to supply a recirculating flow of oil to the IDG of the engine. One or more of the fuel-oil heat exchangers of the heat exchange system may be described as forming part of the secondary closed loop system. A secondary fuel-oil heat exchanger may form part of the second closed loop system.

In examples where the gas turbine engine comprises two fuel-oil heat exchangers, the primary fuel-oil heat exchanger may receive a flow of oil from the primary closed loop system and the secondary fuel-oil heat exchanger may receive a flow of oil from the secondary closed loop system. Different, separated, oils may therefore flow through each closed loop system. The two oils may or may not have the same composition—they may be chemically distinct—and may or may not have the same flow rate.

The secondary closed loop system may comprise a second oil tank. A further scavenge pump may be configured to pump oil from a second sump to the second oil tank. A further feed pump may be configured to pump a flow of oil from the second oil tank. The secondary closed loop system may comprise a similar, or different, arrangement of valves, filters and the like to the primary closed loop system.

The secondary fuel-oil heat exchanger uses oil from the secondary closed loop system to heat the fuel/uses fuel to cool the oil from the secondary closed loop system.

The primary closed loop system and the secondary closed loop system may be configured to interact via at least one oil-oil heat exchanger such that heat may be transferred from one flow of oil to another. In this way, a flow of oil in one closed loop system having a lower average temperature may be used to cool a flow of oil in the other closed loop system having a higher average temperature.

It will be appreciated that, in examples in which a primary closed loop system provides oil to lubricate a main gearbox, and optionally also journal bearings supporting the main shaft(s) of an aircraft gas turbine engine, and a secondary closed loop system provides oil to lubricate an integrated drive generator gearbox, more heat may be output into oil in the primary closed loop system than into oil in the secondary closed loop system. In some examples, a flow rate of oil may be lower through the IDG than through the main gearbox, such that the oil temperature on leaving the main gearbox may be the same as or lower than that of oil leaving the IDG. However, in many examples, the oil leaving the main gearbox may be hotter than that leaving the IDG.

The flow of fuel flows from the secondary fuel-oil heat exchanger towards the primary fuel-oil heat exchanger. In this way, the flow of fuel flows from the integrated drive generator fuel-oil heat exchanger towards the main fuel-oil heat exchanger. In this way, heat may be transferred from the secondary oil to the fuel before heat is transferred from the oil which lubricates the gearbox to the fuel.

At cruise conditions, the average temperature of the flow of oil flowing through the integrated drive generator fuel-oil heat exchanger may be lower than the average temperature of the flow of oil flowing through the main fuel-oil heat exchanger. In this way, the fuel passes through the heat exchanger having a lower average oil flow temperature first, before passing through the heat exchanger having a higher average oil flow temperature.

At cruise conditions, the flow of oil entering any of the fuel-oil heat exchangers may have a higher average temperature than the flow of fuel entering the same fuel-oil heat exchanger. In this way, thermal energy may be transferred from the flow of oil to the flow of fuel flowing through the one or more fuel-oil heat exchangers at cruise conditions. As such, oil leaving the heat exchanger(s) may have a lower temperature than oil entering the heat exchanger(s), at cruise conditions.

The gas turbine engine may comprise one or more air-oil heat exchangers. The one or more air-oil heat exchangers may be described as forming part of the recirculating lubrication system.

One or more air-oil heat exchangers may be arranged in parallel with one or more of the fuel-oil heat exchangers such that at least a portion of the flow of oil flows through the fuel-oil heat exchanger and at least a portion of the flow of oil flows through the one or more air-oil heat exchangers.

Where the primary and/or secondary closed loop systems comprise at least one fuel-oil heat exchanger and at least one air-oil heat exchanger, at least a portion of the flow of oil may not flow through the fuel-oil heat exchanger and/or air-oil heat exchanger. The portion may be adjustable.

For example, when at least one fuel-oil heat exchanger and at least one air-oil heat exchanger are provided in flow series, at least one flow bypass may be configured to allow at least a portion of the flow of oil to bypass and therefore not flow through the fuel-oil heat exchanger and/or the air-oil heat exchanger.

When at least one fuel-oil heat exchanger and at least one air-oil heat exchanger are provided in parallel, the recirculating lubrication system may be configured such that any suitable percentage of oil flows through each of the fuel-oil and air-oil heat exchangers. Bypass pipes may also be provided.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades).

Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flow-path (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed).

The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000m to 15000m, for example in the range of from 10000m to 12000m, for example in the range of from 10400m to 11600m (around 38000 ft), for example in the range of from 10500m to 11500m, for example in the range of from 10600m to 11400m, for example in the range of from 10700m (around 35000 ft) to 11300m, for example in the range of from 10800m to 11200m, for example in the range of from 10900m to 11100m, for example on the order of 11000m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect.

Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
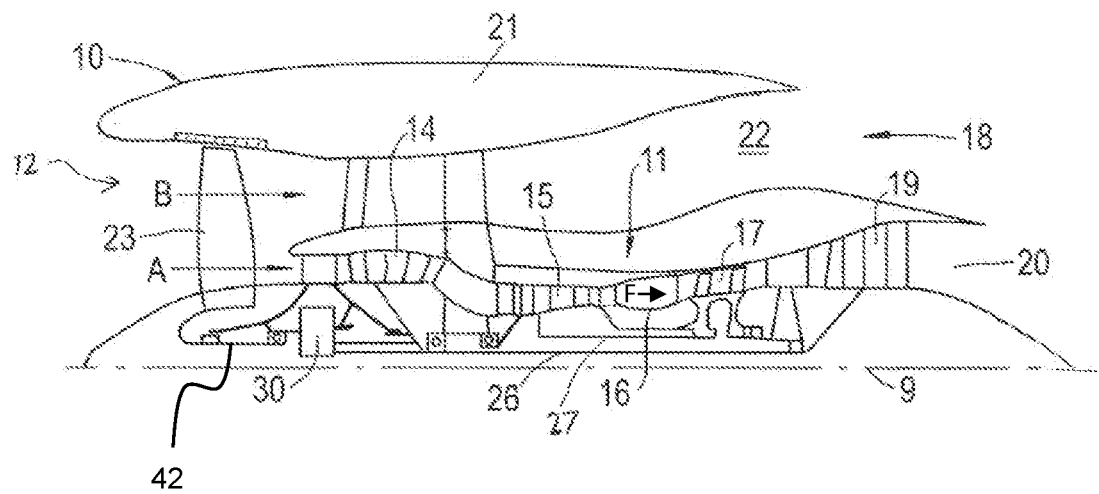
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
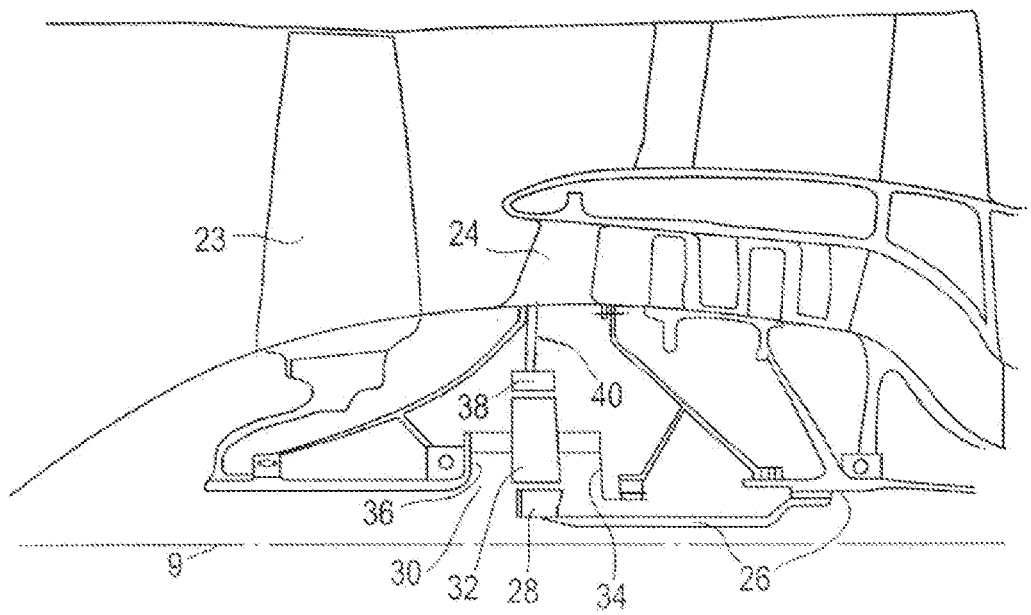
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
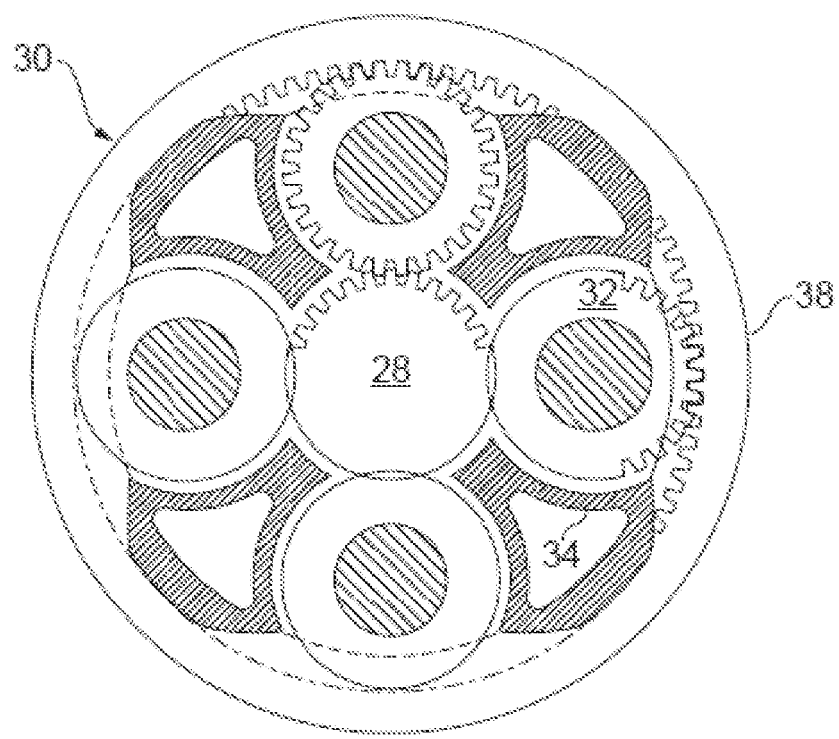
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft (e.g. fan shaft 42) and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
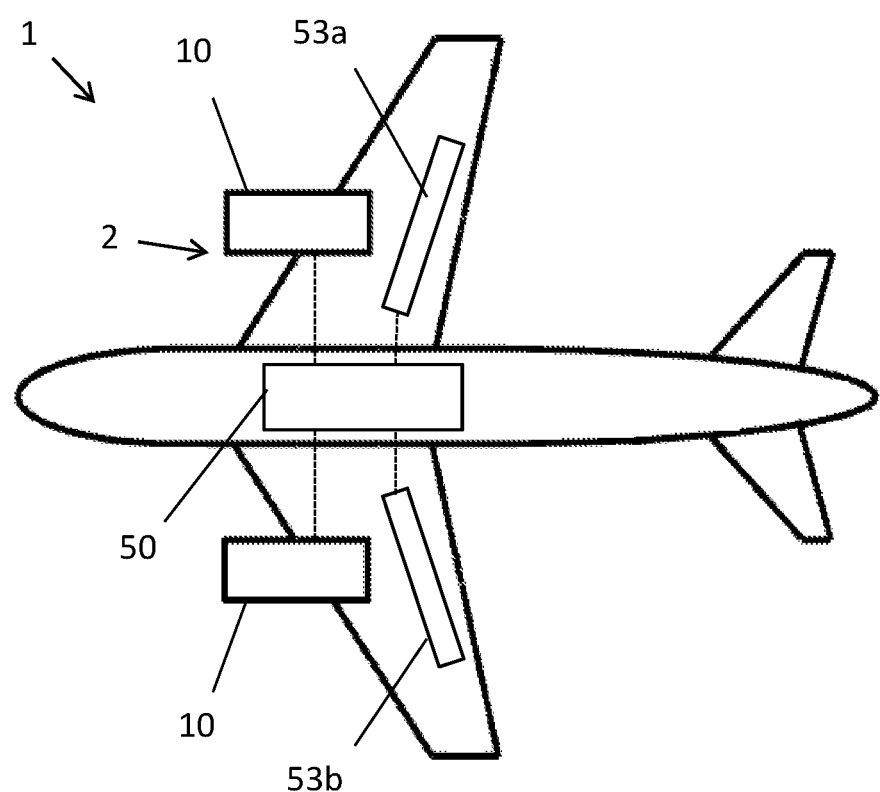
FIG. 4 shows an example aircraft comprising two gas turbine engines.

As depicted in FIG. 4, an aircraft 1 may comprise multiple fuel tanks 50, 53; for example a larger, primary fuel tank 50 located in the aircraft fuselage, and a smaller fuel tank 53a, 53b located in each wing. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting.

FIG. 4 shows an aircraft 1 with a propulsion system 2 comprising two gas turbine engines 10. The gas turbine engines 10 are supplied with fuel from a fuel supply system onboard the aircraft 1. The fuel supply system of the examples pictured comprises a single fuel source 50, 53.

For the purposes of the present application the term "fuel source" means either 1) a single fuel tank or 2) a plurality of fuel tanks which are fluidly interconnected.

In the present examples, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks. It will be appreciated that this tank arrangement is provided by way of example only, and is not limiting on the scope of this disclosure. For example, the wing tanks 53a, 53b may be fluidly interconnected with each other, but fluidly isolated from the centre fuel tank 50, providing two separate fuel sources, which may contain chemically distinct fuels.

Figure 5:
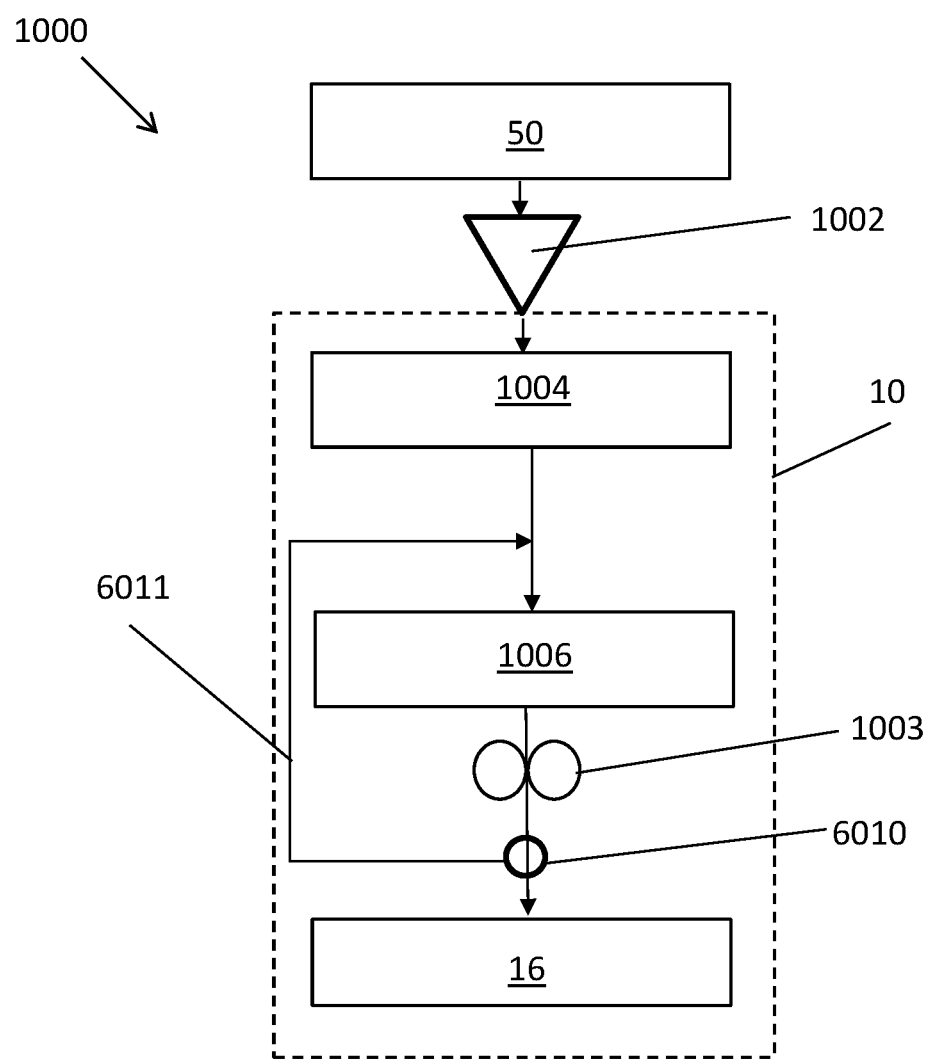
FIG. 5 is a schematic representation of an example fuel system.

An example fuel system 1000 comprising a fuel flow path from the fuel tank 50 to the combustor 16 of the gas turbine engine 10 of the aircraft 1 is shown schematically in FIG. 5. The fuel system 1000 comprises both the fuel supply system (comprising one or more tanks 50, 53, and a fuel pump 1002) arranged to supply fuel from the fuel source(s) 50, 53 to each engine 10, and a fuel management system within the engine arranged to supply the provided fuel to the combustor 16. The fuel management system manages fuel temperature as well as fuel flow, directing the fuel via one or more heat exchangers of the engine's heat exchange system.

Fuel is pumped from the fuel tank 50 towards the gas turbine engine 10 by a low pressure fuel pump 1002. In the implementation pictured, the fuel flows from the fuel tank 50 through an integrated drive generator (IDG) fuel-oil heat exchanger 1004 before flowing through a main fuel-oil heat exchanger 1006. The two heat exchangers 1004, 1006 form part of the engine's heat exchange system 1004, 1006. The heat exchange system 1004, 1006 may comprise one or more additional heat exchangers and/or other components, as well as fluid connections (e.g. pipes) between the components of the heat exchange system.

From the main fuel-oil heat exchanger 1006 the fuel flows to the combustor 16 of the gas turbine engine 10, where it is burned to power the gas turbine engine 10. The engine fuel pump 1003 pumps the fuel towards the combustor 16. The main fuel-oil heat exchanger 1006, which is also referred to as the primary fuel-oil heat exchanger 1006, may have oil used to lubricate and/or cool a main gearbox 30 of the gas turbine engine 10 passing therethrough, and may therefore be described as a main fuel-oil heat exchanger. The oil passing through the primary fuel-oil heat exchanger 1006 may additionally be used to cool and/or lubricate one or more other engine components 33, such as an auxiliary gearbox 33. The IDG fuel-oil heat exchanger 1004 may have oil used to lubricate and/or cool one or more components of an integrated drive generator 2006 passing therethrough, and may therefore be described as an integrated drive generator fuel-oil heat exchanger.

In the example shown in FIG. 5, a recirculation loop 6010, 6011 is also shown, comprising a recirculation valve 6010 located downstream of the primary fuel-oil heat exchanger 1006 and the engine fuel pump 1003, and arranged to recirculate at least a portion of the fuel leaving the pump 1003 back to the inlet of the primary fuel-oil heat exchanger 1006, allowing further heat transfer between the oil of the primary loop system and the fuel. The recirculation valve 6010 may determine what proportion of the fuel is recirculated, and what proportion continues to the combustor 16. The recirculation pipe 6011 returns the recirculated fuel to a point on the flow-path upstream of both the main pump 1003 and the primary heat exchanger 1006, such that the recirculated fuel passes through both of those components an additional time. In other examples, this recirculation loop may not be present.

Figure 6:
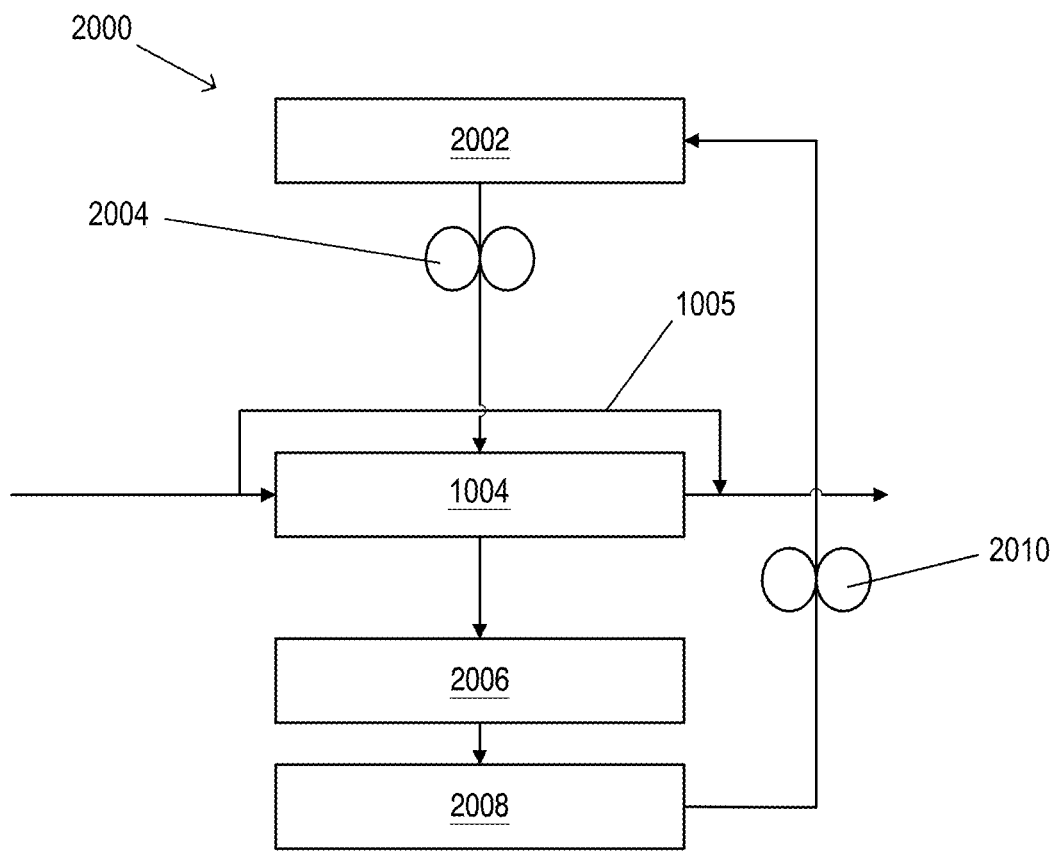
FIG. 6 is a schematic representation of a portion of an example recirculating lubrication system.
Figure 7:
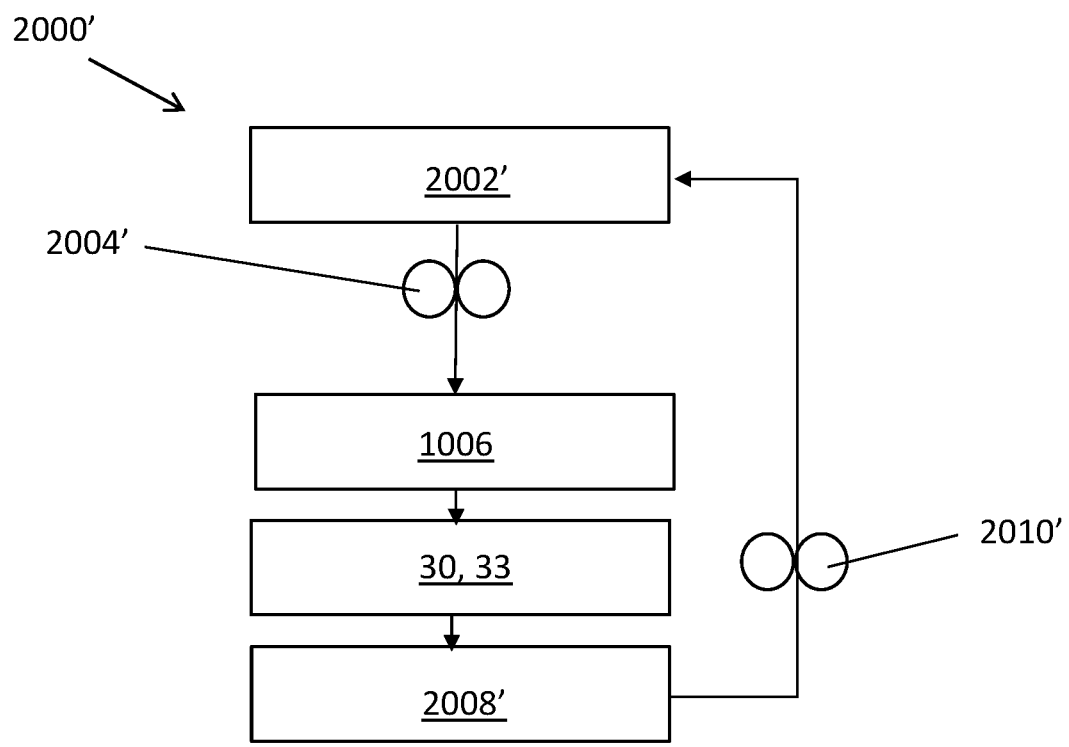
FIG. 7 is a schematic representation of another portion of an example recirculating lubrication system.

In the implementation being described, the main fuel-oil heat exchanger 1006 and the IDG fuel-oil heat exchanger 1004 are configured such that a flow of fuel is conveyed therethrough. In general, at least the majority of the fuel which passes through the IDG fuel-oil heat exchanger 1004 also passes through the main fuel-oil heat exchanger 1006, although each heat exchanger 1004, 1006 may be provided with a bypass to allow some of the fuel to avoid passing through the respective heat exchanger. The two heat exchangers 1004, 1006 may therefore be described as being in series with each other, with respect to fuel flow. The IDG fuel-oil heat exchanger 1004 and the main fuel-oil heat exchanger 1006 are configured such that a flow of oil is also conveyed through each—the oil flowing through one is different from the oil flowing through the other in the implementation being described, although it will be appreciated that the same oil may flow through one fuel-oil heat exchanger and then through another fuel-oil heat exchanger in other implementations. The two heat exchangers 1004, 1006 are therefore in separate closed loop systems 2000, 2000' with respect to oil flow, as shown in FIGS. 6 and 7, in the implementation being described.

The IDG fuel-oil heat exchanger 1004 and the main fuel-oil heat exchanger 1006 are configured such that heat may be transferred between the oil flowing therethrough and the fuel flowing therethrough. At cruise conditions, the average temperature of the flow of oil entering the main fuel-oil heat exchanger 1006 and of oil entering the IDG fuel-oil heat exchanger 1004 is higher than the average temperature of the fuel entering the main fuel-oil heat exchanger 1006 and the IDG fuel-oil heat exchanger 1004 respectively. In this way, the main fuel-oil heat exchanger 1006 and the IDG fuel-oil heat exchanger 1004 are configured to transfer thermal energy from a flow of oil to a flow of fuel flowing therethrough at cruise conditions.

The aircraft 1 comprises a recirculating lubrication system arranged to supply oil to lubricate and remove heat from a plurality of components. The recirculating lubrication system, in some examples, comprises one closed loop oil system or two separate closed loop oil systems as described above. An example of a secondary closed loop oil system 2000 is shown schematically in FIG. 6. The secondary closed loop oil system 2000 is described first as it is the first oil system with which the fuel interacts on entering the engine 10.

The secondary closed loop oil system 2000 comprises an oil tank 2002 suitable for containing a volume of oil. In some implementations, gases are removed from oil within the oil tank 2002 by a de-aerator.

A feed pump 2004 is configured to pump oil from the oil tank 2002 to the IDG fuel-oil heat exchanger 1004 (the secondary heat exchanger 1004). The average temperature of the oil entering the IDG fuel-oil heat exchanger 1004, at cruise conditions, is higher than the average temperature of fuel entering the IDG fuel-oil heat exchanger 1004. In the IDG fuel-oil heat exchanger 1004, thermal energy is transferred from the flow of oil to the flow of fuel. In this way, the average temperature of the flow of oil leaving the IDG fuel-oil heat exchanger 1004 is lower than the average temperature of the flow of oil entering IDG fuel-oil heat exchanger 1004. Also in this way, the average temperature of the fuel leaving the IDG fuel-oil heat exchanger 1004 is higher than the average temperature of fuel entering the IDG fuel-oil heat exchanger 1004.

The flow of oil is then conveyed to/back to an integrated drive generator 2006, where it lubricates moving components and is heated up in the process. In some implementations, the oil may be used primarily as a coolant for the IDG 2006, and may do minimal or no lubrication.

From the integrated drive generator 2006, the oil collects in a sump 2008. A scavenge pump 2010 is configured to pump oil from the second sump 2008 back into the oil tank 2002, ready for re-use.

In alternative implementations, the components may be differently arranged. For example, the IDG fuel-oil heat exchanger 1004 may be located immediately after the IDG 2006, or on the oil flow path between the second sump 2008 and the oil tank 2002 (rather than after the oil tank). More heat transfer into the fuel from the oil may be obtained in such arrangements, as heat loss from the oil to the surroundings in the sump 2008 and/or tank 2002 may be reduced. In implementations in which the heat exchanger 1004 cools the oil on a point on the oil flow path shortly after it leaves the IDG 2006 (rather than shortly before it re-enters it), the oil pumps 2004, 2010 may be provided with lower operating temperatures, which might improve their longevity (although a corresponding increase in oil viscosities for cooler oil may counterbalance that in some implementations, depending on pump and oil types). It will be appreciated that the closed loop oil system 2000 shown is therefore depicted by way of example only, and that various alternative orderings are contemplated.

A primary closed loop closed loop oil system 2000' (the second to be reached by the fuel) comprises a second oil tank 2002' suitable for containing a volume of oil, as shown in FIG. 7. In some implementations, gases are removed from oil within the second oil tank 2002' by a de-aerator.

A second feed pump 2004' is configured to pump oil from the second oil tank 2002' to the main (primary) fuel-oil heat exchanger 1006. The average temperature of the oil entering the main fuel-oil heat exchanger 1006, at cruise conditions, is higher than the average temperature of fuel entering the main fuel-oil heat exchanger 1006. In the main fuel-oil heat exchanger 1006, thermal energy is transferred from the flow of oil to the flow of fuel. In this way, the average temperature of the flow of oil leaving the main fuel-oil heat exchanger 1006 is lower than the average temperature of the flow of oil entering the main fuel-oil heat exchanger 1006, so it is cooled before re-use as a lubricant, allowing the cooled oil to remove more heat from the system to be lubricated. Also in this way, the average temperature of the fuel leaving the main fuel-oil heat exchanger 1006 is higher than the average temperature of fuel entering the main fuel-oil heat exchanger 1006.

The flow of oil is then conveyed to a power gearbox 30, which may also be described as a main gearbox 30 of the gas turbine engine 10, and generally also to other engine components 33 including an auxiliary gearbox (AGB) and one or more bearing chambers.

The flow of oil may be split into two or more parallel flows, for example one flow through the main gearbox 30 and one flow through the other engine components 33, or multiple parallel flows through the main gearbox 30 (e.g. via different components of the gearbox) and separate flows through the AGB 33 and the or each bearing chamber 33.

The power gearbox 30 is arranged to receive an input from the core shaft and to output drive to the fan via the fan shaft 42, and therefore may comprise, or have associated therewith, one or more bearings to support the shafts, which may be journal bearings. One or more journal bearings may be associated with the gears 28, 32, 38. The oil may be used to lubricate the journal bearings, and generally increases in temperature significantly in use at cruise conditions, so assisting with cooling the bearings as the flow of oil transports heat away from the bearings.

The engine components 33 cooled, and optionally also lubricated, by the oil flow generally comprise an AGB 33. The AGB, also known as an accessory drive, is a gearbox that forms part of the gas turbine engine 10, although is not a part of the engine's core 11 and does not drive the fan 23. The AGB instead drives the engine accessories, e.g. fuel pumps, and generally handled large loads. A relatively large amount of heat may therefore be dumped into the oil from the AGB. One or more bearing chambers may be lubricated by the same oil, and may similarly dump heat into the oil. Per unit of oil flowing therethrough, the AGB and bearing chambers 33 may add more heat to the oil than the main gearbox 30 does in most implementations.

For example, in various implementations at cruise conditions, the exit temperature of oil from the power gear box 30 may be a maximum of 160° C., and optionally in the range from 100° C. to 160° C. By contrast, oil leaving the AGB and/or the various bearing chambers 33 may have a temperature in the range from 160° C. to 220° C. In implementations in which the flow does not split, the oil may flow through the main gearbox 30 before entering the AGB 33. One or more valves may be provided to control oil flow split.

From the power gearbox 30 and any other engine components 33 cooled by oil of the primary closed loop closed loop oil system 2000', the oil collects in a second sump 2008'. A second scavenge pump 2010' is configured to pump oil from the second sump 2008' back into the second oil tank 2002', ready for re-use. The sump 2008' may be a single sump, or may be composed of a plurality of separate sumps, for example one each for each of the various components 30, 33. Similarly to the sump(s), multiple scavenge pumps may be used in some implementations.

As for the secondary oil loop system 2000 described above, it will be appreciated that component arrangements may vary between implementations.

Figure 8:
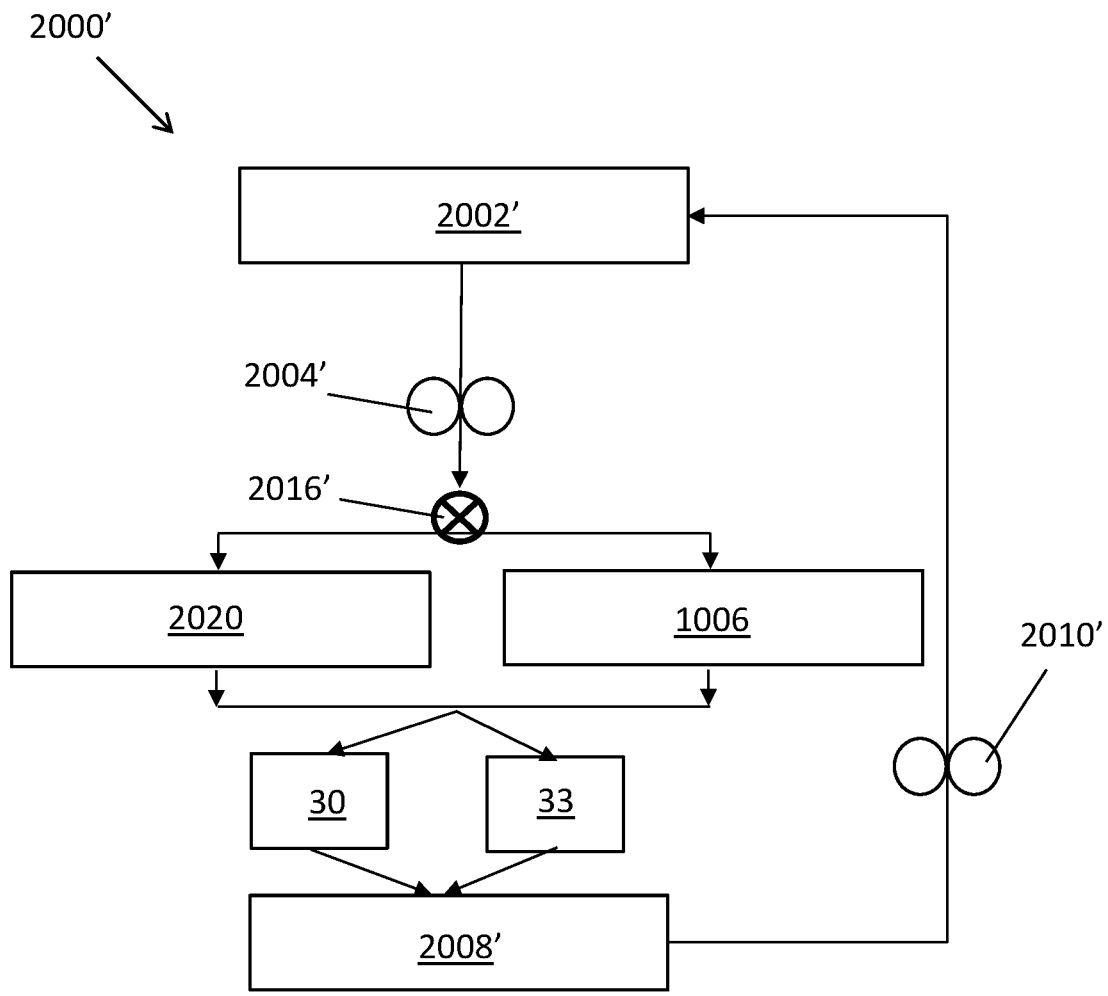
FIG. 8 is a schematic representation of a portion of an example recirculating lubrication system.

FIG. 8 shows schematically an alternative primary closed loop oil system 2000' to that shown in FIG. 7, comprising a branching oil flow. In this system, a flow of oil is pumped by the feed pump 2004' through a valve 2016'. The valve 2016' is operable to split the flow of oil between the main fuel-oil heat exchanger 1006 and a first air-oil heat exchanger 2020, where the first air-oil heat exchanger 2020 is arranged in parallel with the main fuel-oil heat exchanger 1006. The oil flow path may be described as branching, with the main fuel-oil heat exchanger 1006 on one branch and the first air-oil heat exchanger 2020 on the other branch, in a parallel configuration such that oil can flow via one branch or the other, but the same portion of oil cannot pass through both on the same cycle—the flow splits. The flows of oil are then recombined and conveyed to the power gearbox 30 and to any other engine components 33 to be cooled/lubricated by the oil. Any suitable percentage of oil may flow through each of the first air-oil heat exchanger 2020 and the main fuel-oil heat exchanger 1006. In some examples, the valve 2016' is operable to vary the flow of oil to the main fuel-oil heat exchanger 1006 and the first air-oil heat exchanger 2020.

In various examples, an oil-oil heat exchanger (not shown) may be provided, for example being arranged in series with the first air-oil heat exchanger 2020 on that branch of the parallel split. The oil-oil heat exchanger may allow for heat exchange between the primary and secondary closed loop oil systems.

It will also be appreciated that in examples any of the fuel-oil heat exchangers may be arranged in series or in parallel with one or more air-oil heat exchangers and/or oil-oil heat exchangers.

Figure 9:
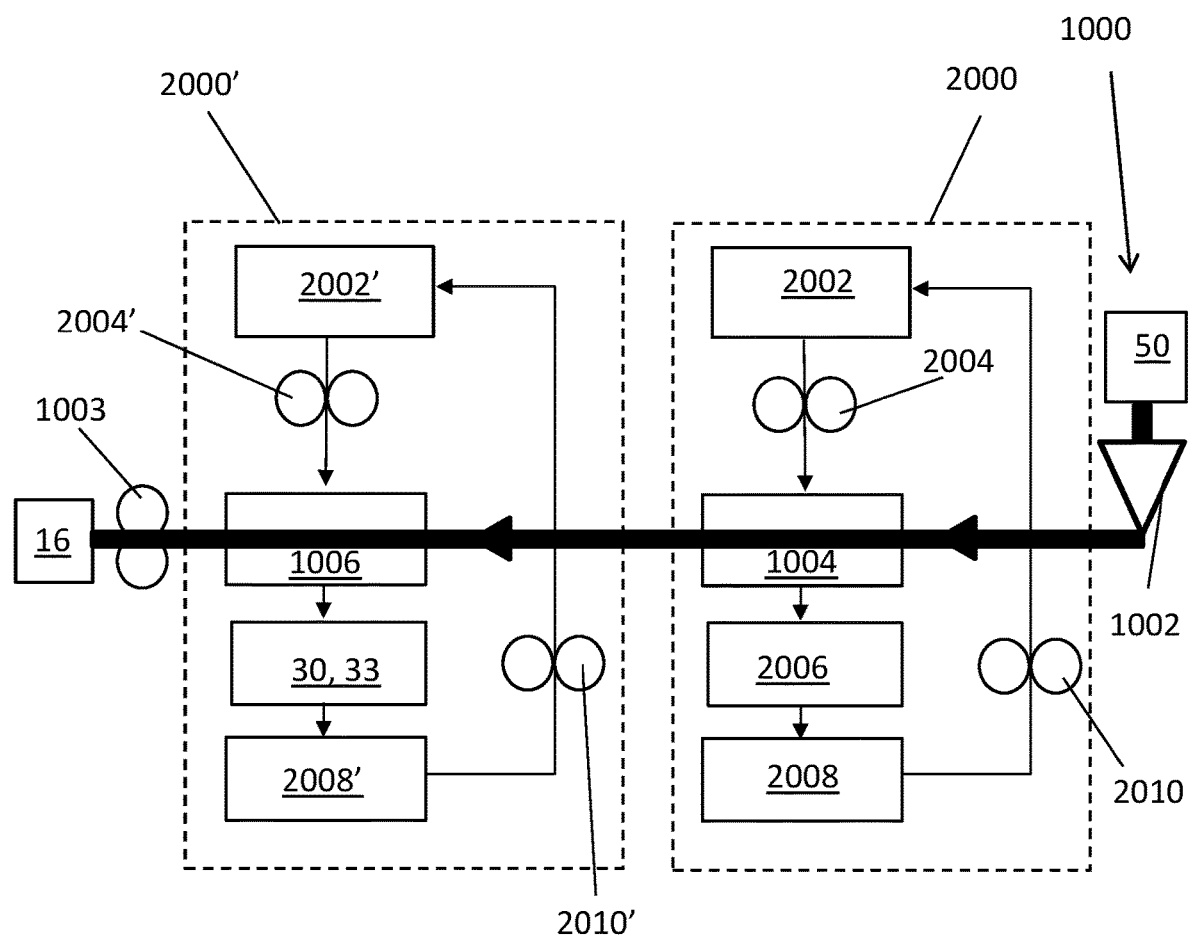
FIG. 9 is a schematic representation of an example fuel system and an example recirculating lubrication system.

FIG. 9 shows schematically an example arrangement and interaction of the secondary closed loop oil system 2000, primary closed loop oil system 2000', and fuel system 1000.

The secondary closed loop oil system 2000 of this example arrangement is arranged generally as shown in FIG. 6 (with the exception of the optional bypass pipe 1005 which is not shown here). The primary closed loop oil system 2000' of this example arrangement is arranged as shown in FIG. 7. The fuel system 1000 of this example arrangement is arranged as shown in FIG. 5, but without the recirculation loop 6010, 6011. Oil flow is illustrated with thin black lines and fuel flow with thicker black lines.

In use, fuel is pumped from the fuel tank 50 by the low pressure fuel pump 1002. The fuel then flows through the IDG fuel-oil heat exchanger 1004. The secondary closed loop oil system 2000 is configured such that the recirculating flow of oil also flows through the IDG fuel-oil heat exchanger 1004.

At cruise conditions, the average temperature of the flow of oil entering the IDG fuel-oil heat exchanger 1004 is higher than the average temperature of the flow of fuel entering the IDG fuel-oil heat exchanger 1004. The IDG fuel-oil heat exchanger 1004 is configured such that heat is transferred from the flow of oil to the flow of fuel. In this way, the average temperature of the flow of oil on exit from the IDG fuel-oil heat exchanger 1004 is lower than the average temperature of the flow of oil on entry to the IDG fuel-oil heat exchanger 1004. In the same way, the average temperature of the flow of fuel on exit from the IDG fuel-oil heat exchanger 1004 is higher than the average temperature of the flow of fuel on entry to the IDG fuel-oil heat exchanger 1004.

At cruise conditions, the average temperature of the flow of oil entering the main fuel-oil heat exchanger 1006 is higher than the average temperature of the flow of fuel entering the main fuel-oil heat exchanger 1006. The main fuel-oil heat exchanger 1006 is configured such that heat is transferred from the flow of oil to the flow of fuel. In this way, the average temperature of the flow of oil on exit from the main fuel-oil heat exchanger 1006 is lower than the average temperature of the flow of oil on entry to the main fuel-oil heat exchanger 1006. In the same way, the average temperature of the flow of fuel on exit from the main fuel-oil heat exchanger 1006 is higher than the average temperature of the flow of fuel on entry to the main fuel-oil heat exchanger 1006.

At cruise conditions, the average temperature of the flow of oil flowing through the IDG fuel-oil heat exchanger 1004 may be lower than the average temperature of the flow of oil flowing through the main fuel-oil heat exchanger 1006. In this way, the fuel passes through the heat exchanger having a lower average oil flow temperature first, before passing through the heat exchanger having a higher average oil flow temperature.

After flowing through the main fuel-oil heat exchanger 1006, the fuel flows to the combustor 16 of the gas turbine engine 10.

In some examples, the heat transferred from the oil to the fuel in the heat exchange system may raise the fuel temperature to an average of at least 135° C., 140° C., 150° C., 160° C., 170° C., 180° C., 190° C., or 200° C. on entry to the combustor 16 at cruise conditions.

In some examples, the heat transferred from the oil to the fuel in the heat exchange system may raise the fuel temperature to an average of between 135-150° C., 135-160° C., 135-170° C., 135-180° C., 135-190° C., or 135-200° C. on entry to the combustor 16 at cruise conditions.

Optionally, one or more additional heat sources may be used to warm the fuel to reach the desired temperature, alongside the oil-fuel heat transfer.

In some examples, the heat transferred from the oil to the fuel in the heat exchange system may be 200-600 kJ/m$^3$ at cruise conditions (measured per cubic meter of the fuel reaching the combustor).

In some examples, the heat transferred from the oil to the fuel before the fuel enters the combustor may lower the fuel viscosity to between 0.58 mm$^2$/s and 0.30 mm$^2$/s on entry to the combustor 16 at cruise conditions.

In some examples, the heat transferred from the oil to the fuel before the fuel enters the combustor may lower the fuel viscosity to between 0.50 mm$^2$/s and 0.35 mm$^2$/s, or between 0.48 mm$^2$/s and 0.40 mm$^2$/s, or between 0.44 mm$^2$/s and 0.42 mm$^2$/s on entry to the combustor 16 at cruise conditions.

In some examples, the heat transferred from the oil to the fuel before the fuel enters to the combustor may lower the fuel viscosity to 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31 or 0.30 mm$^2$/s, or lower, on entry to the combustor 16 at cruise conditions.

Figure 10:
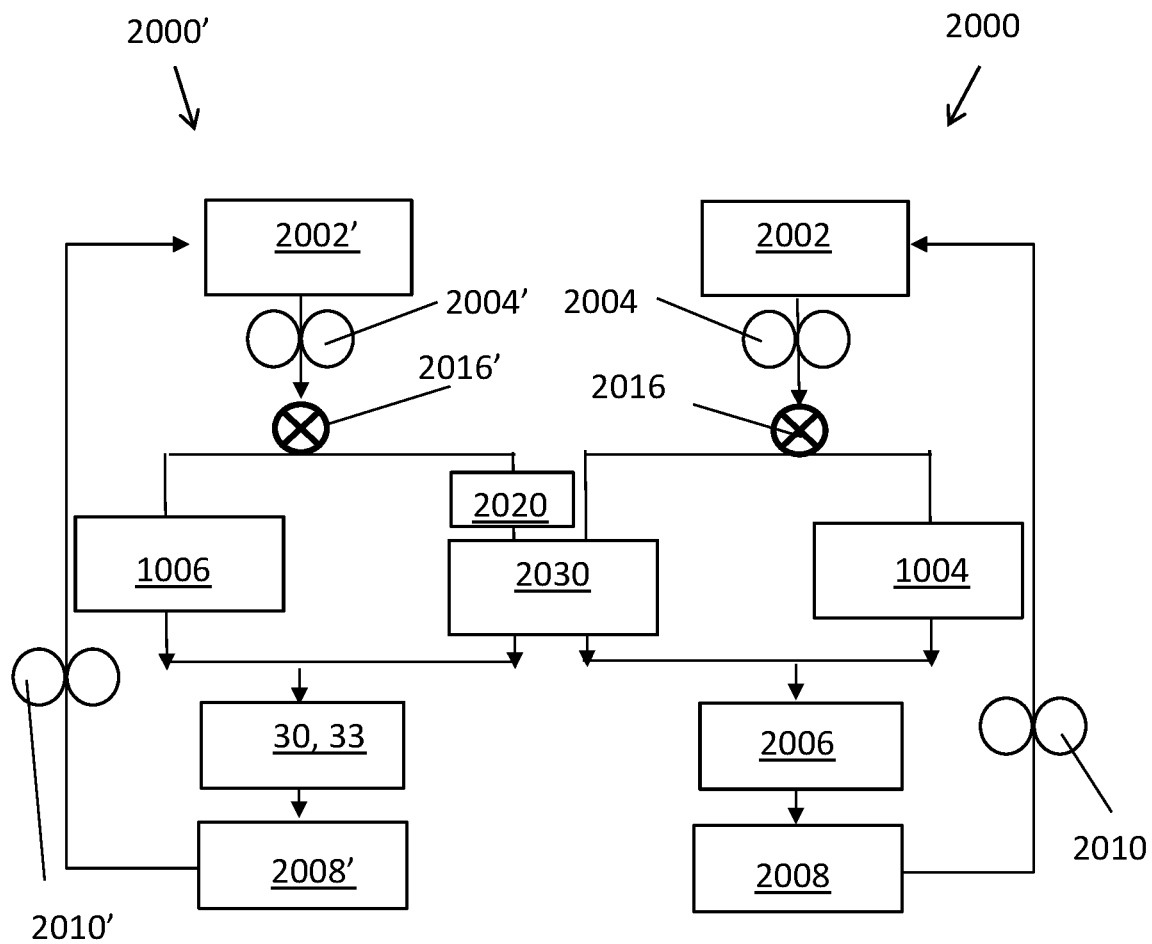
FIG. 10 is a schematic representation of an example recirculating lubrication system.

FIG. 10 shows schematically an example configuration of the secondary closed loop oil system 2000 and the primary closed loop oil system 2000' where the two independent recirculating flows of oil are brought into a heat exchange relationship through an oil-oil heat exchanger 2030.

The secondary closed loop oil system 2000 of this example arrangement is arranged as shown in FIG. 6, but with an oil-oil heat exchanger 2030 in parallel with the secondary fuel-oil heat exchanger 1004, and an additional valve 2016. The primary closed loop oil system 2000' of this example arrangement is arranged as shown in FIG. 8. The fuel system 1000 of this example arrangement is arranged as shown in FIG. 5, but without the recirculation loop 6010, 6011. Oil flow is illustrated with thin black lines.

In the example shown in FIG. 10, the secondary closed loop oil system 2000 is configured such that the recirculating flow of oil is pumped by the feed pump 2004 through a valve 2016.

The valve 2016 is operable to split flow of oil between the IDG fuel-oil heat exchanger 1004 and the oil-oil heat exchanger 2030, the oil-oil heat exchanger 2030 being arranged in parallel with the IDG fuel-oil heat exchanger 1004. In other examples, the oil-oil heat exchanger 2030 may instead be in series with the secondary fuel-oil heat exchanger 1004, and the secondary oil flow may not branch, and therefore no such valve 2016 may be provided.

In examples, any suitable portion of the flow of oil may be diverted between the IDG fuel-oil heat exchanger 1004 and the oil-oil heat exchanger 2030. In examples, the valve 2016 is operable to divert a fixed portion of the flow of oil to each of the IDG fuel-oil heat exchanger 1004 and the oil-oil heat exchanger 2030. In other examples, the valve 2016 is operable to divert a variable portion of the flow of oil to each of the IDG fuel-oil heat exchanger 1004 and the oil-oil heat exchanger 2030. The split of oil may be varied based on output from one or more sensors—e.g. fuel temperature or viscosity sensors and/or oil temperature sensors.

After flowing through the heat exchangers, the flow of oil is then conveyed to the integrated drive generator 2006 and then to the sump 2008. The scavenge pump 2010 then pumps the oil from the sump 2008 to the oil tank 2002, for re-use.

The flow of oil within the secondary closed loop oil system 2000 is arranged to be brought into a heat exchange relationship with the separate flow of oil within the primary closed loop oil system 2000' through the oil-oil heat exchanger 2030. In the oil-oil heat exchanger 2030 the flow of oil within the secondary closed loop oil system 2000 does not mix with the flow of oil within the primary closed loop oil system 2000'. The oil-oil heat exchanger 2030 is configured such that a transfer of heat may take place between the two separated flows of oil. In this way, heat from the hotter flow of oil may be transferred to the cooler flow of oil within the oil-oil heat exchanger 2030.

The primary closed loop oil system 2000' is configured such that the recirculating flow of oil is pumped by the second feed pump 2004' through a valve 2016'. The valve 2016' is operable to divert at least a portion of the flow of oil to both the main fuel-oil heat exchanger 1006 and a first air-oil heat exchanger 2020, where the first air-oil heat exchanger 2020 is in series with the oil-oil heat exchanger 2030, and the air-oil 2020 and oil-oil heat exchanger 2030 arrangement is arranged in parallel with the main fuel-oil heat exchanger 1006.

In examples, any suitable portion of the flow of oil may be split between the main fuel-oil heat exchanger 1006 and the first air-oil heat exchanger 2020. In examples, the valve 2016' is operable to divert a fixed portion of the flow of oil to each of the main fuel-oil heat exchanger 1006 and the first air-oil heat exchanger 2020. In other examples, the valve 2016' is operable to divert a variable portion of the flow of oil to each of the main fuel-oil heat exchanger 1006 and the first air-oil heat exchanger 2020. The split of oil (i.e. what proportion goes down each branch of the parallel arrangement) may again be varied based on output from one or more sensors—e.g. fuel temperature or viscosity sensors and/or oil temperature sensors.

After flowing through the heat exchangers, the flow of oil is then conveyed to the power gearbox 30 and/or other engine components 33 and then to the second sump 2008'. The second scavenge pump 2010' then pumps the oil from the second sump 2008' to the second oil tank 2002', for re-use.

The inventors appreciated that careful selection and control of fuel based on parameters such as viscosity and temperature can affect combustion efficiency, in particular with respect to fuel nozzle spray performance within the combustor (e.g. droplet size and distribution), and/or improve component longevity (e.g. by reducing creep and/or damage due to differing thermal expansion coefficients of components on thermal cycling in use, and reducing deposition of thermal decomposition products of the fuel within the pump which can result in blockages, so resulting in deterioration in delivery flow over the life of the pump). Using the fuel to take more heat from the oil, rather than relying on heat transfer from the oil to the environment/air (e.g., in the air-oil heat exchanger) provides a more thermally efficient turbine engine 10. The reduced maximum temperature to which the pump is exposed may reduce creep, reduce thermal damage to components such as seals, and/or reduce damage over cycling resulting from different thermal expansions of different pump components, so extending pump life/improving pump performance for a given pump age. In addition, bearing film thickness in the pump 1003 may be improved if temperatures of fuel in the pump are kept lower by placing the pump before a further heat exchanger. Fuel is the lubricant for the pump bearings, and fuel viscosity generally reduces as temperature increases, so deleteriously reducing film thickness. Reducing the fuel temperature may result in an increase in the viscosity of the fuel, which generally enhances the performance of the bearing surfaces inside the pump 1003, so reducing wear and hence reducing deterioration in flow delivery with time. In addition, lower fuel temperatures generally reduce the formation of fuel breakdown products which also have a detrimental effect on the life and reliability of the pump 1003. The lower fuel temperature may therefore also increase reliability. The lower temperature may also reduce damage to journal bearings and thrust bearings. Other relevant factors include variation in cavitation (cooler fuel is denser and has a lower vapour pressure) and lubricity; cooler fuel is beneficial from the volumetric pump output perspective, so a pump 1003 may be kept on-wing longer/may have a longer useful lifespan if used with cooler fuel. However, increasing the fuel temperature may provide benefits such as improved combustion in some implementations, and a suitable balance may therefore be selected—heat exchange between oil and fuel may therefore be adjusted as appropriate to achieve the desired characteristics at cruise.

Figure 11:
FIG. 11 is an example method of operating a gas turbine engine.
Figure 11:

FIG. 11 illustrates an example method 11000 of operating a gas turbine engine 10. The method 11000 comprises the steps of:

Step 11100: Conveying the fuel from the fuel tank 50 to the combustor 16 via the heat exchange system.

The gas turbine engine 10 comprises a primary oil loop system 2000' arranged to supply oil to lubricate and/or cool the gearbox 30 and optionally also other engine components 33, the oil having an average temperature of at least 180° C. on entry to the heat exchange system at cruise conditions (after gaining heat from the main gearbox 30 and optionally also from the other engine components 33), and the heat exchange system is arranged to transfer heat from the oil (and optionally also from one or more additional sources) to the fuel.

Step 11200: Controlling the heat exchange system so as to transfer heat from the oil to the fuel, so as to raise the fuel temperature to an average of at least 135° C. on entry to the combustor at cruise conditions.

Step 11200 may also be described as transferring 11200 heat from the oil to the fuel, using the heat exchange system 1004, 1006, so as to raise the fuel temperature to an average of at least 135° C. on entry to the combustor 16 at cruise conditions.

In various implementations as discussed above, the controlling 11200 the heat exchange system may comprise controlling fuel flow through the primary and secondary fuel-oil heat exchangers 1006, 1004.

Fuel flow may be controlled using a recirculation valve 6010 where present. An actively controlled amount of fuel leaving the primary heat exchanger 1006 may be recirculated to the primary heat exchanger 1006 rather than flowing directly to the combustor 16. This recirculation may also take fuel which has already passed through the engine fuel pump 1003 back to a position upstream of the engine fuel pump 1003.

Alternatively or additionally, fuel flow may be controlled by using one or more bypass pipes arranged to allow a proportion of the fuel to avoid passing through either or both fuel-oil heat exchangers e.g. bypass pipe 1005 shown in FIG. 6 and arranged to allow fuel to bypass the secondary heat exchanger 1004.

The speed of the pump 1003 may also be adjusted, either speeding up fuel flow rate (so reducing heat transfer per unit volume passing through the heat exchangers) or reducing fuel flow rate (so increasing heat transfer per unit volume passing through the heat exchangers).

The controlling 11200 the heat exchange system may comprise controlling oil flow through the primary and secondary fuel-oil heat exchangers 1006, 1004, and/or through one or more other heat exchangers—e.g. an oil-oil heat exchanger 2030 between separate closed loop oil systems or an air-oil heat exchanger 2020.

Additionally or alternatively, as for fuel flow, oil flow may be controlled using one or more bypass pipes, where present, allowing oil to bypass one or more heat exchangers 1004, 1006 instead of flowing therethrough. Oil may also be recirculated in some implementations, and/or oil flow rate may be adjusted by controlling one or more oil pumps.

The heat exchange system may comprise a controller arranged to implement this control. The controller may receive inputs from one or more temperature sensors, and may control one or more valves (e.g. 2016, 2016' as shown in FIG. 10), and/or the pump 1003, based on the received data.

This active control may be performed based on one or more parameters such as:
Core shaft speed and engine thrust demand;
Current fuel temperature and/or oil temperature at one or more locations;
Fuel calorific value;
Fuel viscosity;
Fuel flow rate to the combustor (commonly referred to as WFE—Weight of Main Engine Fuel Flow);
Fan rotational speed; and
Main/engine fuel pump speed, or speed options.

In alternative examples, the control of the amount of fuel leaving the primary fuel-oil heat exchanger 1006 to be recirculated may not be an active method step—instead, a set, fixed, proportion of the fuel may be recirculated. Alternatively, no fuel may be recirculated, and no recirculation route may be available in some implementations.

The inventors also appreciated that careful control of heat transfer from oil into the fuel might allow more efficient use to be made of newer fuels, adjusting parameters at cruise conditions to improve combustion efficiency and/or improve component longevity, and allow for more efficient oil cooling, as discussed above.

Figure 12:
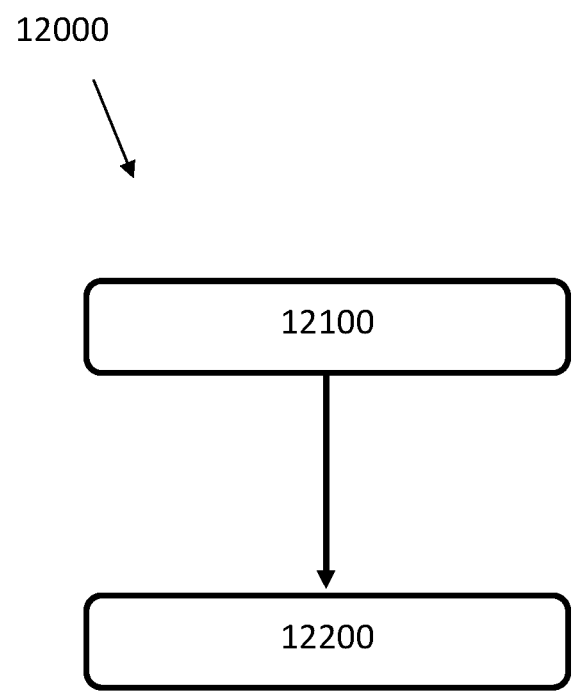
FIG. 12 is an example method of operating a gas turbine engine.

FIG. 12 illustrates an example method 12000 of operating a gas turbine engine 10. The method 12000 comprises the steps of:

Step 12100: Conveying the fuel from the from the fuel tank 50 to the combustor 16 via the heat exchange system.

The gas turbine engine 10 comprises a primary oil loop system 2000' arranged to supply oil to lubricate and/or cool the gearbox 30 and optionally also other engine components 33 such as an AGB, the oil having an average temperature of at least 180° C. on entry to the heat exchange system at cruise conditions (after gaining heat from the main gearbox 30 and optionally also from the other engine components 33), and the heat exchange system is arranged to transfer heat from the oil (and optionally also from one or more additional sources) to the fuel as the fuel flows from the fuel tank 50 and towards the combustor 16.

As discussed with respect to FIG. 5, the fuel system 1000 may comprise a main (primary) fuel-oil heat exchanger 1006 and an IDG (secondary) fuel-oil heat exchanger 1004 arranged to transfer heat to a flow of fuel. The fuel system 1000 may be arranged so that the fuel reaches the IDG fuel-oil heat exchanger 1004 before the main fuel-oil heat exchanger 1006.

Step 12200: Controlling the heat exchange system so as to transfer 200-600 kJ/m$^3$ of heat (per cubic metre of fuel reaching the combustor) to the fuel from the oil at cruise conditions. This step 12200 may be used to control the oil temperature on entry to the gearbox 30.

Step 12200 may also be described as transferring 12200 200-600 kJ/m$^3$ of heat to the fuel from the oil, through the heat exchange system 1004, 1006, at cruise conditions so as to control the oil temperature on entry to the gearbox 30.

The heat transfer may be obtained in one or more fuel-oil heat exchangers (although it will be appreciated that an intermediate heat transfer fluid could be used in some implementations rather than a direct oil to fuel heat transfer).

In various implementations as discussed above, the controlling 12200 the heat exchange system may comprise controlling fuel flow through the primary and secondary fuel-oil heat exchangers 1006, 1004.

Control of the heat exchange system may be or comprise substantially the same control mechanisms as discussed with respect to step 11200 of the method 11000 of FIG. 11.

The method of FIG. 12 may be used in conjunction with the method of FIG. 11.

The inventors also appreciated that careful selection and control of fuel based on parameters such as viscosity can affect combustion efficiency, in particular with respect to fuel nozzle spray performance within the combustor. Fuel nozzle spray performance affects burn efficiency of the fuel as mentioned above, so engine efficiency can be improved with the selection of desired viscosity. Further, careful control of fuel viscosity can also improve pump performance, and potentially improve pump longevity—for example, a lower-viscosity fluid may put less strain on the pump for the same pumping rate.

Figure 13:
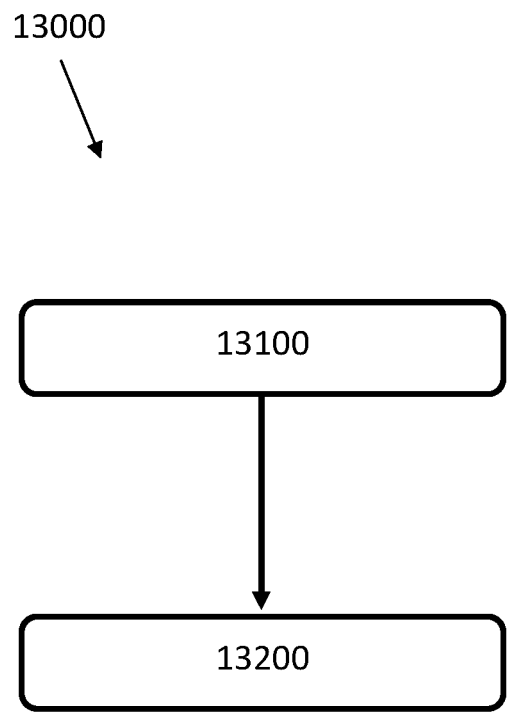
FIG. 13 is an example method of operating a gas turbine engine.

FIG. 13 illustrates an example method 13000 of operating a gas turbine engine 10. The method 13000 comprises the steps of:

Step 13100: Conveying the fuel from the from the fuel tank 50 to the combustor 16 via the heat exchange system.

The gas turbine engine 10 comprises a primary oil loop system 2000' arranged to supply oil to lubricate and/or cool the gearbox 30 and optionally also other engine components 33, the oil having an average temperature of at least 180° C. on entry to the heat exchange system at cruise conditions, and the heat exchange system is arranged to transfer heat from the oil (and optionally also from one or more additional sources) to the fuel.

As discussed with respect to FIG. 5, the fuel system 1000 may comprise a main (primary) fuel-oil heat exchanger 1006 and an IDG (secondary) fuel-oil heat exchanger 1004 arranged to transfer heat to a flow of fuel. The fuel system 1000 may be arranged so that the fuel reaches the IDG fuel-oil heat exchanger 1004 before the main fuel-oil heat exchanger 1006.

Step 13200: Controlling the heat exchange system so as to lower the fuel viscosity to a maximum of 0.58 mm$^2$/s on entry to the combustor at cruise conditions.

Step 13200 may also be described as transferring 13200 heat from the oil to the fuel, using the heat exchange system 1004, 1006, so as to lower the fuel viscosity to a value below or equal to 0.58 mm²/s on entry to the combustor 16 at cruise conditions.

In various implementations as discussed above, the controlling 13200 the heat exchange system may comprise controlling fuel flow through the primary and secondary fuel-oil heat exchangers 1006, 1004.

Control 13200 of the heat exchange system may be or comprise substantially the same control mechanisms as discussed with respect to step 11200 of the method 11000 described with respect to FIG. 11.

The method 13000 of FIG. 13 may be used in conjunction with the method of FIG. 11 and/or the method of FIG. 12.

It will be understood that the invention is not limited to the implementations above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:
   an engine core comprising a turbine, a compressor, a combustor configured to combust a fuel, and a core shaft connecting the turbine to the compressor;
   a fan located upstream of the engine core;
   a fan shaft;
   a main gearbox that receives an input from the core shaft and outputs drive to the fan via the fan shaft;
   a primary oil loop system configured to supply oil to lubricate the main gearbox; and
   a heat exchange system configured to transfer heat between the oil and the fuel, the oil having an average temperature of at least 180°C on entry to the heat exchange system at cruise conditions,
   the method comprising:
   controlling the heat exchange system to lower viscosity of the fuel to a maximum of 0.58 mm²/s on entry to the combustor at cruise conditions, wherein
   the fuel comprises sustainable aviation fuel, the sustainable aviation fuel is up to 100% of the fuel, and the sustainable aviation fuel has density of between 90% and 98% that of kerosene and a calorific value of between 101% and 105% that of kerosene.

2. The method of claim 1, wherein the method comprises transferring heat from the oil to the fuel to lower the viscosity of the fuel to between 0.30 mm²/s and 0.58 mm²/s on entry to the combustor at cruise conditions.

3. The method of claim 1, wherein the method comprises transferring heat from the oil to the fuel to lower the viscosity of the fuel to between 0.35 mm²/s and 0.50 mm²/s on entry to the combustor at cruise conditions.

4. The method of claim 1, wherein the method comprises transferring heat from the oil to the fuel to lower the viscosity of the fuel to between 0.40 mm²/s and 0.48 mm²/s on entry to the combustor at cruise conditions.

5. The method of claim 1, wherein the method comprises transferring heat from the oil to the fuel to lower the viscosity of the fuel to between 0.42 mm²/s and 0.44 mm²/s on entry to the combustor at cruise conditions.

6. The method of claim 1, wherein the oil has an average temperature of at least 200° C. on entry to the heat exchange system at cruise conditions.

7. The method of claim 1, wherein
   the gas turbine engine further comprises:
   an integrated drive generator; and
   a secondary oil loop system configured to provide oil to the integrated drive generator; and
   the heat exchange system comprises an oil-oil heat exchanger configured to transfer heat between the oil of the primary loop system and the oil of the secondary loop system.

8. The method of claim 7, wherein
   the primary oil loop system comprises two branches through which oil flows, to provide a parallel heat exchanger configuration, and an air-oil heat exchanger, and
   the oil-oil heat exchanger is on the same branch as the air-oil heat exchanger.

9. The method of claim 1, wherein
   the gas turbine engine further comprises:
   an integrated drive generator; and
   a secondary oil loop system configured to provide oil to the integrated drive generator;
   the heat exchange system comprises:
   a primary fuel-oil heat exchanger configured to receive the fuel and oil from the primary oil loop system; and
   a secondary fuel-oil heat exchanger configured to receive the fuel and oil from the secondary oil loop system; and
   and wherein the method comprises transferring heat between the oil from the secondary oil loop system and the fuel using the secondary fuel-oil heat exchanger.

10. The method of claim 9, wherein the fuel flows through the secondary fuel-oil heat exchanger prior to flowing through the primary fuel-oil heat exchanger, such that heat is transferred from the oil in the secondary oil loop system to the fuel before heat is transferred from the oil in the primary oil loop system to the fuel.

11. The method of claim 9, wherein the controlling the heat exchange system comprises adjusting an amount of fuel sent through at least one of the primary fuel-oil heat exchanger and the secondary fuel-oil heat exchanger.

12. The method of claim 1, wherein
   the heat exchange system comprises at least one bypass pipe configured to allow fuel to bypass a heat exchanger of the heat exchange system, and
   the method comprises adjusting an amount the of fuel sent through the bypass pipe instead of through the heat exchanger.

13. The method of claim 9, wherein more heat is output into oil in the primary oil loop system by the main gearbox than is output into oil in the secondary oil loop system by the integrated drive generator.

14. The method of claim 1, wherein
   the heat exchange system comprises multiple heat exchangers configured to cool the oil,
   the multiple heat exchangers include a fuel-oil heat exchanger and at least one other heat exchanger and are arranged in a parallel configuration, and
   the method comprises sending a proportion of the oil through each branch of the parallel configuration, and adjusting the proportion to vary how much oil flows through the fuel-oil heat exchanger and how much oil flows through a heat exchanger on the other branch.

15. The method of claim 9, wherein the primary oil loop system and the secondary oil loop system are configured to interact via at least one oil-oil heat exchanger such that heat may be transferred from one flow of oil to the other.

16. A gas turbine engine for an aircraft, the gas turbine engine comprising:
- an engine core comprising a turbine, a compressor, a combustor configured to combust a fuel, and a core shaft connecting the turbine to the compressor;
- a fan located upstream of the engine core;
- a fan shaft;
- a main gearbox configured to receive an input from the core shaft and to output drive to the fan via the fan shaft;
- a primary oil loop system configured to supply oil to lubricate the main gearbox; and
- a heat exchange system configured to transfer heat between the oil and the fuel, the primary oil loop system being configured such that the oil has an average temperature of at least 180° ° C. on entry to the heat exchange system at cruise conditions, wherein
- the heat exchange system is configured to transfer heat from the oil to the fuel to lower viscosity of the fuel to a maximum of 0.58 mm$^2$/s on entry to the combustor at cruise conditions, and
- the fuel comprises sustainable aviation fuel, the sustainable aviation fuel is up to 100% of the fuel, and the sustainable aviation fuel has density of between 90% and 98% that of kerosene and a calorific value of between 101% and 105% that of kerosene.

17. The gas turbine engine of claim 16, wherein the heat exchange system is configured to transfer heat from the oil to the fuel to lower the viscosity of the fuel between 0.40 mm$^2$/s and 0.48 mm$^2$/s on entry to the combustor at cruise conditions.

18. The gas turbine engine of claim 16, further comprising an integrated drive generator and a secondary closed loop oil system, wherein the secondary closed loop system is configured to provide oil to the integrated drive generator, and wherein the heat exchange system is configured to transfer heat from the oil in the secondary closed loop system to the fuel.

19. The gas turbine engine of claim 16, wherein the heat exchange system comprises multiple heat exchangers configured to cool the oil, the multiple heat exchangers including a fuel-oil heat exchanger and at least one of:
   (i) an air-oil heat exchanger; and
   (ii) an oil-oil heat exchanger, having a flow of oil from a different source flowing therethrough.

20. The gas turbine engine of claim 18, further comprising at least one oil-oil heat exchanger, wherein the primary closed loop system and the secondary closed loop system are configured to interact via the at least one oil-oil heat exchanger such that heat may be transferred from one flow of oil to the other.

21. The method of claim 1, wherein
the sustainable aviation fuel is up to 10% of the fuel.

22. The method of claim 1, wherein
the sustainable aviation fuel is between 10% and 50% of the fuel.

23. The method of claim 1, wherein
the sustainable aviation fuel is 100% of the fuel.

* * * * *